US012737215B2

(12) United States Patent
Boderck et al.

(10) Patent No.: US 12,737,215 B2
(45) Date of Patent: Sep. 15, 2026

(54) PRE-LAUNCHING AN APPLICATION USING INTERPROCESS COMMUNICATION

(71) Applicant: GOOGLE LLC, Mountain View, CA (US)

(72) Inventors: Joe Boderck, Sunnyvale, CA (US); Satvik Chauhan, Campbell, CA (US); Rajat Kansal, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 615 days.

(21) Appl. No.: 18/041,751

(22) PCT Filed: Sep. 9, 2020

(86) PCT No.: PCT/US2020/070513

§ 371 (c)(1),
(2) Date: Feb. 15, 2023

(87) PCT Pub. No.: WO2022/055538

PCT Pub. Date: Mar. 17, 2022

(65) Prior Publication Data

US 2024/0012677 A1 Jan. 11, 2024

(51) Int. Cl.
*G06F 9/48* (2006.01)
*G06F 9/54* (2006.01)

(52) U.S. Cl.
CPC .......... *G06F 9/4843* (2013.01); *G06F 9/4837* (2013.01); *G06F 9/54* (2013.01)

(58) Field of Classification Search
CPC ........ G06F 9/4843; G06F 9/4837; G06F 9/54; G06F 9/4806

(Continued)

(56) References Cited

U.S. PATENT DOCUMENTS 8,578,394 B2 * 11/2013 Srour ...................... G06F 9/485 718/100
8,949,712 B1 * 2/2015 Days ..................... G06F 40/186 715/204

(Continued)

FOREIGN PATENT DOCUMENTS

CN 105431822 A 3/2016
CN 107491296 A 12/2017

(Continued)

OTHER PUBLICATIONS

International Search Report and Written Opinion for PCT Application No. PCT/US2020/070513, mailed on May 10, 2021, 14 pages.

*Primary Examiner* — Pierre Vital
*Assistant Examiner* — Daniel Trainor
(74) *Attorney, Agent, or Firm* — BRAKE HUGHES BELLERMANN LLP

(57) ABSTRACT

According to an aspect, a method includes executing a first application as a foreground process of an operating system of a computing device, and displaying, by the first application, content on a display of the computing device, where the content is associated with an action executable by a second application. The method includes transmitting, by the first application, an initialization request to an initialization application programming interface (API) of the second application in advance of a user action taken with respect to the content displayed on the display, where the initialization request is configured to cause the second application to be launched as a background process of the operating system of the computing device.

19 Claims, 14 Drawing Sheets

(58) Field of Classification Search
USPC .......................................................... 718/100
See application file for complete search history.

(56) References Cited

U.S. PATENT DOCUMENTS

| | | | | |
|---|---|---|---|---|
| 10,146,842 | B2 | 12/2018 | Yeom et al. | |
| 10,505,872 | B2 | 12/2019 | Peterson et al. | |
| 10,613,713 | B2 | 4/2020 | Ozuysal | |
| 11,995,393 | B2 | 5/2024 | Ozuysal | |
| 2003/0218765 | A1* | 11/2003 | Ohishi | G06F 9/4843 358/1.15 |
| 2004/0030882 | A1 | 2/2004 | Forman | |
| 2012/0042317 | A1 | 2/2012 | Nguyen et al. | |
| 2012/0324481 | A1 | 12/2012 | Xia et al. | |
| 2014/0047173 | A1 | 2/2014 | Nguyen et al. | |
| 2014/0372356 | A1 | 12/2014 | Bilal et al. | |
| 2014/0373032 | A1* | 12/2014 | Merry | G06F 9/54 719/328 |
| 2015/0347748 | A1* | 12/2015 | Krstic | G06F 9/541 726/1 |
| 2017/0147658 | A1 | 5/2017 | Yeom et al. | |
| 2021/0182099 | A1* | 6/2021 | Ochoa | G06F 9/4881 |

FOREIGN PATENT DOCUMENTS

| | | | |
|---|---|---|---|
| CN | 108139852 | A | 6/2018 |
| CN | 108140037 | A | 6/2018 |
| CN | 106406966 | B | 4/2020 |
| EP | 3008616 | A1 | 4/2016 |
| EP | 3255909 | A1 | 12/2017 |

* cited by examiner

PRE-LAUNCHING AN APPLICATION USING INTERPROCESS COMMUNICATION

CROSS REFERENCE TO RELATED APPLICATION

This application is a 35 U.S.C. § 371 National Phase Entry Application from PCT/US2020/070513, filed Sep. 9, 2020, designating the U.S., the disclosure of which is incorporated herein by reference in its entirety.

TECHNICAL FIELD

This disclosure relates to pre-launching an application using interprocess communication.

BACKGROUND

An application, executing on a device, may be displaying content that, when selected, causes another application to be launched. However, the delay from selecting the content and then launching and rendering the application linked to the content may be relatively long.

SUMMARY

This disclosure relates to pre-launching an application using interprocess communication (IPC) to improve deep link landing latency. For example, application A may be executing as a foreground process, where application A is displaying content on a device's display. If a user selects the content, application B may be launched and displayed within the computing device's display. However, according to the embodiments, before receipt of an action is taken with respect to the displayed content (e.g., before the user selects the content), application A may call an initialization API of application B so that application B can be launched as a background process. Then, when the user actually selects the content, application B can be rendered on the display relatively quickly since application B was pre-launched.

According to an aspect, a method includes executing a first application as a foreground process of an operating system of a computing device, and displaying, by the first application, content on a display of the computing device, where the content is associated with an action executable by a second application. The method includes transmitting, by the first application, an initialization request to an initialization application programming interface (API) of the second application in advance of a user action taken with respect to the content displayed on the display, where the initialization request is configured to cause the second application to be launched as a background process of the operating system of the computing device.

According to an aspect, a non-transitory computer-readable medium storing executable instructions that when executed by at least one processor cause the at least one processor to execute a first application as a foreground process of an operating system of a computing device, display, by the first application, content on a display of the computing device, where the content is associated with an action executable by a second application, and transmit, by the first application, an initialization request to an initialization application programming interface (API) of the second application in advance of a user action taken with respect to the content displayed on the display, where the initialization request is configured to cause the second application to be launched as a background process of the operating system of the computing device According to an aspect, an apparatus includes at least one processor, and a non-transitory computer-readable medium storing executable instructions that when executed by at least one processor cause the at least one processor to receive, at an initialization application programming interface (API) of a first application, an initialization request from a second application that is executing as a foreground process of an operating system of a computing device in advance of a user action taken with respect to content displayed on a display of the computing device, establish, in response to the initialization request, an interprocess communication connection between the first application and the second application to enable the first application and the second application to communicate with each other, and launch, in response to the initialization request, the first application as a background process of the operating system of the computing device.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
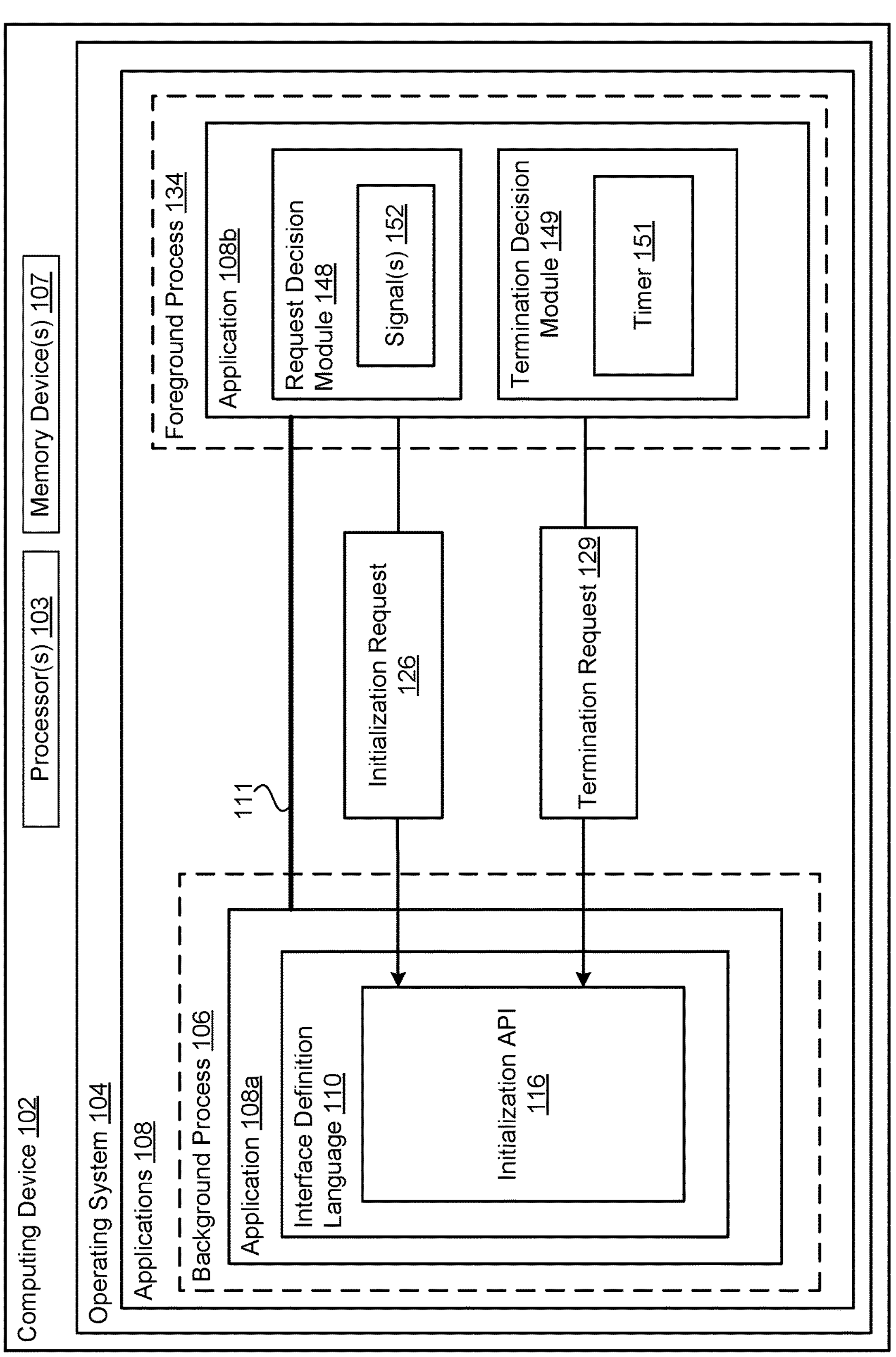
FIG. 1A is a diagram of a computing device configured to enable an application to pre-launch another application using interprocess communication according to an aspect.

This disclosure relates to pre-launching an application using interprocess communication. For example, application A may be executing as a foreground process, where application A is displaying content on a display of a computing device (e.g., a mobile computing device). The content is associated with an action of application B. For example, if a user selects the content, application B may be launched and displayed within the computing device's display. However, according to the embodiments, before receipt of an action is taken with respect to the display content (e.g., before the user selects the content), application A may transmit an initialization request to application B so that application B can be launched as a background process. Then, when the user actually selects the content, application B can be rendered on the display relatively quickly since application B was pre-launched. In some examples, the initialization request also specifies one or more prefetching parameters, which causes application B to prefetch and store content in the background. Then, when the user actually selects the content, the prefetched content can be rendered in application B relatively quickly.

Application B includes an interface definition language that defines an initialization application programming interface (API) that gives a calling application (e.g., application A) the ability to call the pre-launch service. In other words, the initialization API (e.g., also referred to as a pre-launch API) defines a pre-launch interface that can be used by other applications (e.g., application A) to pre-launch application B as a background process of the operating system. The initialization request is received at the initialization API, which causes application B to be launched as a background process. In some examples, receipt of the initialization request causes the creation (or establishment) of an interprocess communication (IPC) connection between application A and application B to enable application A and application B to communicate with each other.

The IPC connection is a communication protocol that allows processes (e.g., applications) to communicate with each other and synchronize their actions. In some examples, receipt of the initialization request binds application A and application B so that information can be exchanged between application A and application B. In some examples, in response to a call to the initialization API from the calling application (e.g., application A), application B can provide a service instance (e.g., a binder) to application A, where the binder is used to identify methods to be invoked and pass arguments between the applications. While the IPC connection remains active, application A and application B can communicate with each other. In some implementations, while the calling application is bound to the called application, the operating system may not terminate the called application.

In some examples, if the IPC connection is terminated (e.g., deactivated), the underlying service (e.g., the pre-launching service) is terminated, thereby causing the background process that is executing application B to be terminated. In some example, in response to the content being moved off the screen (e.g., the content no longer being displayed in application A) or upon the expiration of a timer (e.g., one minute, two minutes, etc.), application A may transmit a termination request (e.g., an unbind service call) to the initialization API of application B, which causes the IPC connection to be terminated, thereby terminating the background process that is executing application B. In this manner, if it is likely that the user will not select the content, application B (which has been pre-launched as a background process) will be closed in order to have those computer resources (e.g., memory, processor) available for other programs.

FIGS. 1A through 1H illustrate a system 100 for pre-launching an application **108*a* using interprocess communication according to an aspect. For example, the system 100 enables an application 108*b* to transmit an initialization request 126 to an initialization application programming interface (API) 116 of an application 108*a* to initialize (e.g., launch) the application 108*a* as a background process 106 of an operating system 104 of a computing device 102**.

The computing device 102 may include one or more processors 103 formed in a substrate configured to execute one or more machine executable instructions or pieces of software, firmware, or a combination thereof. The processors 103 can be semiconductor-based—that is, the processors can include semiconductor material that can perform digital logic. The computing device 102 may include one or more memory devices 107. The memory devices 107 may include a main memory that stores information in a format that can be read and/or executed by the processors 103. The memory devices 107 may store the applications 108, the operating system 104, and modules (e.g., a request decision module 148, a termination decision module 149) that, when executed by the processors 103, perform certain operations.

In some examples, the computing device 102 is a mobile computing device. In some examples, the computing device 102 is a smartphone or tablet. In some examples, the computing device 102 is a wearable device, smart television, or other computing device. In some examples, the computing device 102 is a gaming console. In some examples, the computing device 102 is an automotive heat unit. The operating system 104 is a system software that manages computer hardware, software resources, and provides common services for computing programs. In some examples, the operating system 104 is operable to run on a mobile computer such as a smartphone or tablet. The computing device includes a display 142 (e.g., a touchscreen display, an LED display, etc.) that can display a user interface for an application 108 that is being executed by the computing device 102. More than one application 108 can be executed at a time. However, in some examples (e.g., in the case of a smart phone), the size of the display 142 is better suited for a single executing application 108 to be displayed at a time.

The applications 108 may include any type of computer program executable by the operating system 104. The applications 108 may include mobile applications, e.g., software programs that are developed for a mobile platform or mobile device. The applications 108 includes an application **108*a* and an application 108*b*. The application 108*b* is a software program that is different (and separate) from the application 108*a*. The application 108*a* and the application 108*b* are installed on the operating system 104 of the computing device 102. In some examples, the application 108***a* and/or the application 108*b* are downloaded from an online digital store and installed by the operating system 104 of the computing device 102. In some examples, the application 108*a* and/or the application 108*b* have been pre-installed on the operating system 104 of the computing device 102.

In some examples, the application 108*a* is a mobile application (e.g., an application configured to be executed by a mobile platform or a mobile device). In some examples, the application 108*b* is a mobile application. If a user selects an icon of the application 108*a* (or the application 108*b*) that is displayed on a display 142 of the computing device 102, the operating system 104 may launch as a foreground process 134 and display application content of the application 108*a* (or the application 108*b*) in the display 142. In some examples, the application 108*a* is a digital store application that can download and install digital media (e.g., applications 108 (e.g., mobile apps)) on the computing device 102. In some examples, the application 108*a* is an ecommerce application. In some examples, the application 108*b* is a non-browser application (e.g., not a web browser or a mobile web browser). However, the application 108*a* and the application 108*b* may be any type of application configured to execute on the operating system 104 of the computing device 102.

Figure 1C:
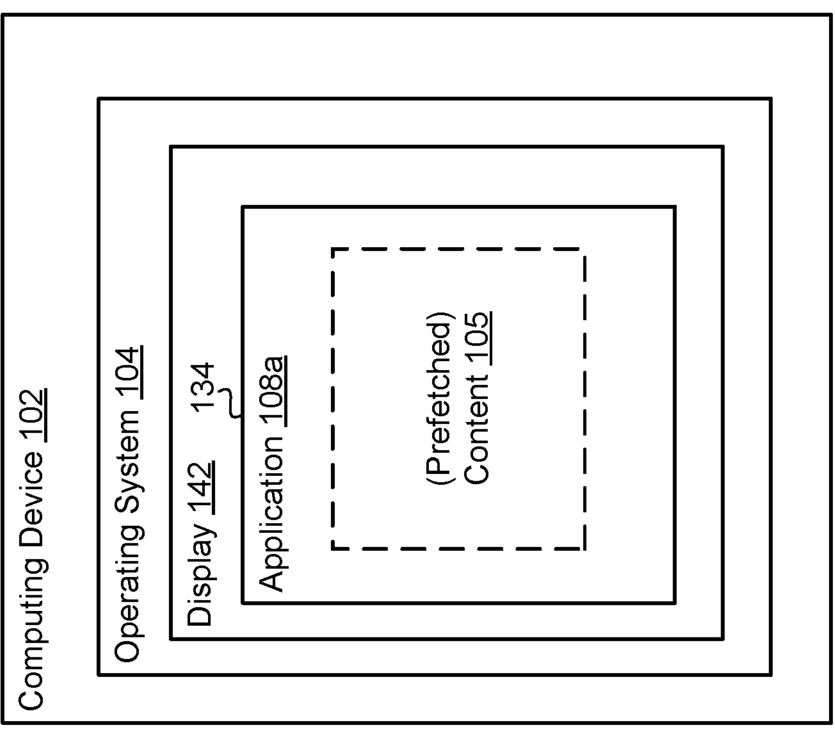
FIG. 1C illustrates a pre-launched application that has been moved into a foreground process according to an aspect.
Figure 1B:
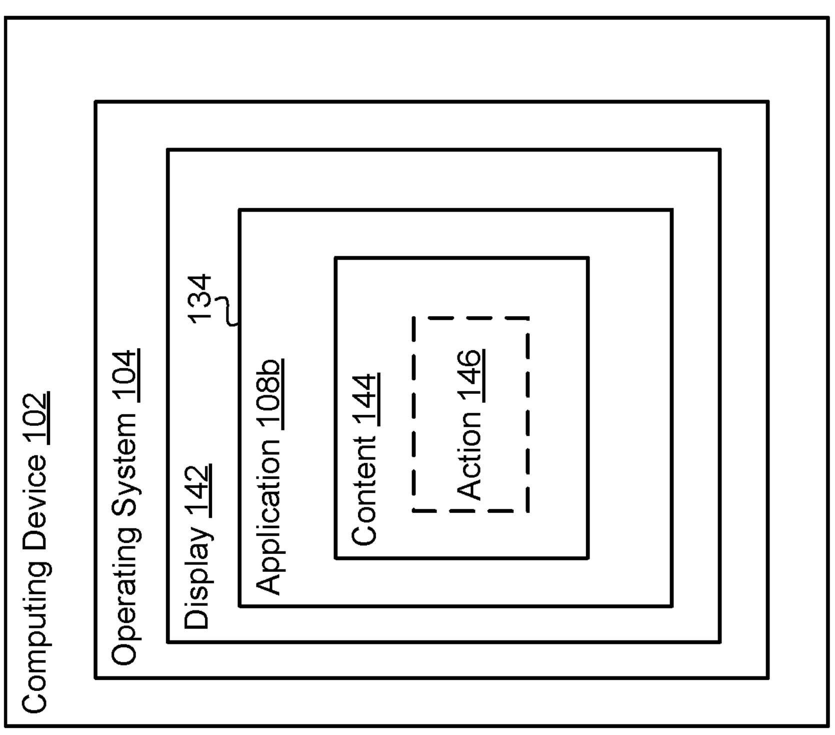
FIG. 1B illustrates an application displaying content as a foreground process in which the content is associated with an action of another application according to an aspect.

Referring to FIGS. 1A and 1B, the application 108*b* may be displaying content 144 on the display 142 of the computing device 102, where the application 108*b* is executing as the foreground process 134. A foreground process 134 is required for what the user is doing and has the highest memory priority. For example, when system memory is low, the operating system 104 may terminate background processes first to free up memory. In some examples, an application 108 that is executing as the foreground process 134 generates content that is displayed on the display 142. In some examples, an application 108 that is executing as the foreground process 134 may refer to an application 108 that is positioned on the display 142, or in other words, an application the user is currently using. In some examples, an application 108 that is executing as the foreground process 134 may refer to an active application which can consume data and/or is currently running on the operating system 104.

The content 144 from application 108*b* that is displayed on the display 142 may be associated with an action 146 executable by a different application, e.g., the application 108*a*. In other words, the application 108*b* may display content 144 (while it is executing as the foreground process 134), but the content 144 (when selected) may initiate an interface in the application 108*a*. For example, if a user-provided action is taken with respect to the content 144 (e.g., the user selects (e.g., taps, clicks on, etc.) on the content 144), the display 142 may switch to the application 108*a* as shown in FIG. 1C. In FIG. 1C, the application 108*a* is now executing as the foreground process 134.

The content 144 may be any type of content generated by the application 108*b* that includes a link to an action 146 performed by another application 108 (e.g., application 108*a*). In some examples, the content 144 includes information about a product or service, which, when selected, causes the application 108*a* to be launched in the foreground process 134. In some examples, the content 144 includes advertisement content (e.g., a mobile ad). In some examples, the content 144 includes an advertisement installment ad. For example, the content 144 may reference another application that is not installed on the computing device 102, but when selected, causes the operating system 104 to launch an application 108*a* (e.g., a digital store application) so that the user can download and install the application referenced by the content 144. In some examples, the selection of the mobile ad (e.g., the content 144) causes an action 146 of launching the digital store application (e.g., application 108*a*) with a deep link or specific intent, e.g., to a user interface for downloading the other application. However, it is noted that the content 144 may be any type of content provided by the application 108*b*, which, when selected, requires an action 146 of another application 108.

Referring to FIGS. 1A and 1B, in advance of a user action taken with respect to the content 144 (e.g., before the user selects the ad), the application 108*b* causes the application 108*a* to be pre-launched as a background process 106 of the operating system 104. In some examples, an application 108 that is executing as the background process 106 does not render a user interface that is displayed on the display 142 of the computing device 102 (e.g., does not have an active UI). In some examples, an application 108 that is executing as the background process 106 may refer to a non-active application but is performing an activity in the background. In some examples, the user is not aware a background process 106 is running. A background process 106 may be less important to what the user is currently doing than a foreground process 134, and, in some examples, is given a lower memory priority by the operating system 104.

Referring to FIG. 1A, the application 108*a* defines an interface definition language 110. The interface definition language 110 defines a programming interface that permits the application 108*a* to communicate with other applications 108 including application 108*b*. According to the embodiments discussed herein, the interface definition language 110 defines an initialization API 116, which a calling application (e.g., application 108*b*) uses to call the pre-launch service. In other words, the initialization API 116 (e.g., also referred to as a pre-launch API) defines a pre-launch interface that can be used by other applications 108 (e.g., application 108*b*) to pre-launch the application 108*a* as a background process 106.

In some examples, when the content 144 of the application 108*b* is displayed on the display 142 (which is before the user has selected the content 144)), the application 108*b* may call the initialization API 116 by transmitting an initialization request 126 to the initialization API 116 of the application 108*a*. The initialization request 126 is received at the initialization API 116, which causes the operation system 104 to launch the application 108*a* as a background process 106 (e.g., running in the background but not displaying an active UI). In some examples, the launching operations may include allocating new memory for the new process (e.g., the background process 106), loading the application code into the process memory, and/or scheduling the new process for CPU time. In some examples, the receipt of the initialization request 126 causes the creation (or establishment) of an interprocess communication (IPC) connection 111 between the application 108*a* and application 108*b* to enable the application 108*a* and the application 108*b* to communicate with each other.

The IPC connection 111 is a communication protocol that allows processes to communicate with each other and synchronize their actions. In some examples, receipt of the initialization request 126 binds the application 108*a* and the application 108*b* (e.g., application 108*a* and application 108*b* are linked) so that information can be exchanged between the application 108*a* and the application 108*b*. In some examples, their execution states are linked or binded when the IPC connection 111 is established. For example, if the user closes application 108*b*, application 108*a* will be closed.

In some examples, when the application 108*a* binds to the application 108*b* (in other words, the foreground process 134 binds to the background process 106), the background process 106 is given the same high priority as the foreground process 134, which allows the pre-launching process to continue even if the device memory is low. For example, conventionally, if the device memory is below a threshold level, the operating system 104 may terminate the background processes. However, when the foreground process 134 binds to the background process 106 (e.g., upon establishment of the IPC connection 111), and, if the device memory is below the threshold level, the operating system 104 is prevented from terminating the background process 106 which is executing the pre-launch process.

In some examples, the application 108*a* can provide a service instance (e.g., a binder) to the application 108*b* where the service instance (e.g., binder) is used to identify methods that can be invoked and to pass arguments between the application 108*a* and the application 108*b*. While the interprocess communication connection 111 remains active, the application 108*a* and the application 108*b* can communicate with each other. In some examples, if the interprocess communication connection 111 is terminated (e.g., deactivated), the underlying service (e.g., the pre-launching service) is terminated, thereby causing the background process 106 executing the application 108*a* to be terminated.

Because application 108*a* is pre-launched, in response to receipt of a user action taken with respect to the content 144 (which requires the action 146 of the application 108*a*), the user interface of application 108*a* may be rendered on the display 142 more quickly, thereby reducing the latency of displaying information associated with the application 108*a*. For example, when the content 144 is selected in FIG. 1B, the application 108*a* can be quickly loaded into the display 142 (in the foreground process 134) as shown in FIG. 1C, where the latency of loading application 108 can be reduced (e.g., significantly reduced) because the application 108*a* is pre-launched as the background process 106.

Figure 1D:
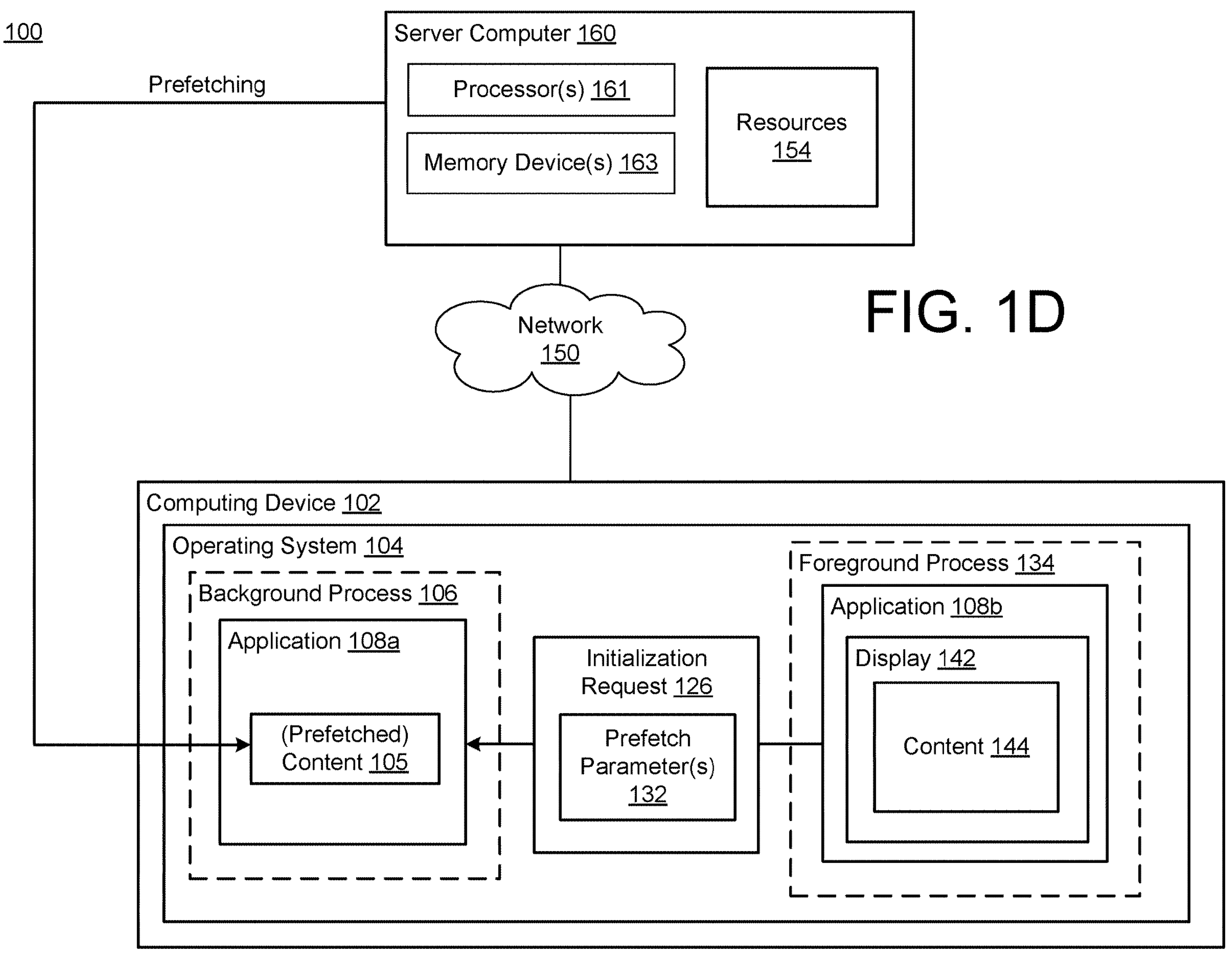
FIG. 1D illustrates a system for enabling an application to cause another application to prefetch content over a network from a server computing according to an aspect.

FIG. 1D illustrates an example of prefetching content 105 as a background process 106 according to an aspect. In some examples, as shown in FIG. 1D, the initialization request 126 indicates to prefetch content 105. In some examples, the term prefetch may refer to the retrieval of information from a server computer 160 connected to the computing device 102 over a network 150 while the application 108*a* is executing as the background process 106 of the operating system 104.

The application 108*b* may be displaying content 144 in the foreground process 134, and before the user has selected the content 144, the application 108*b* may transmit an initialization request 126 that calls the initialization API 116 to pre-launch the application 108*a*, where the initialization request 126 may specify one or more prefetch parameters 132. In some examples, if the application 108*a* is a digital store application, the prefetch parameter(s) 132 may provide an application identifier for the application referenced by the content 144, and the application 108*a* may prefetch details about the application such as the name, downloads, ratings, and/or reviews, etc. In some examples, the prefetch parameter(s) 132 includes an identifier of a resource (e.g., product, application, service, etc.) referenced by the content 144. In some examples, the prefetch parameter(s) 132 includes an application identifier. In some examples, the prefetch parameter(s) 132 include a product or service identifier. In some examples, the prefetch parameter(s) 132 include a uniform resource locator (URL). However, the type of prefetch parameter(s) 132 may be dependent upon the type of application 108*a*. In some examples, if the application 108*a* is an ecommerce site, the prefetch parameter(s) 132 may include the product identifier and/or a product page to prefetch.

If the initialization request 126 specifies one or more prefetch parameters 132, the application 108*a* can prefetch content 105 according to the prefetch parameter(s) 132 in the background and store (e.g., cache) the content 105 in memory (e.g., memory device 107) in advance of a user action taken with respect to the content 144 (e.g., before the user selects the ad). In some examples, in order to prefetch the content 105, the application 108*a* can communicate with the server computer 160, over a network 150, in order to retrieve the content 105 from resources 154 stored at the server computer 160. Then, when the user selects the content 144, the display 142 can be quickly switched to the application 108*a* (e.g., because the application 108*a* is pre-launched), where the application 108*a* quickly displays the content 105 (e.g., because the content 105 is prefetched).

The server computer 160 may be computing devices that take the form of a number of different devices, for example a standard server, a group of such servers, or a rack server system. In some examples, the server computer 160 may be a single system sharing components such as processors and memories. The resources 154 may be any type of computer resources such as web pages or information accessible via the network 150. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 160 may include one or more processors 161 formed in a substrate, an operating system (not shown) and one or more memory devices 163. The memory devices 163 may represent any kind of (or multiple kinds of) memory (e.g., RAM, flash, cache, disk, tape, etc.). In some examples (not shown), the memory devices 163 may include external storage, e.g., memory physically remote from but accessible by the server computer 160. The server computer 160 may include one or more modules or engines representing specially programmed software.

In some examples, the initialization request 126 indicates pre-launch. In some examples, the initialization request 126 includes information to pre-launch and prefetch. In some examples, separate requests are used to instruct the application 108*a* to pre-launch and prefetch. For example, a first request may be transmitted to the initialization API 116 to pre-launch the application 108*a* as a background process 106, and then a second request may be transmitted to the initialization API 116 to prefetch content 105 as a background process 106, where the second request may be sent after the first request or the first and second requests may be transmitted around the same time.

The application 108*b* may transmit the initialization request 126 in response to the content 144 being displayed on the display 142. In some examples, the application 108*b* includes a request decision module 148 that determines whether the application 108*b* should transmit the initialization request 126 to the initialization API 116 to pre-launch and/or prefetch. In some examples, the decision to pre-launch and/or prefetch occurs when the content 144 is displayed on the display 142. In some examples, the decision to pre-launch and/or prefetch occurs at a time instance before the content 144 is displayed on the display 142. In some examples, the decision to pre-launch and/or prefetch occurs at a time instance after the content 144 is displayed on the display 142.

Figure 1E:
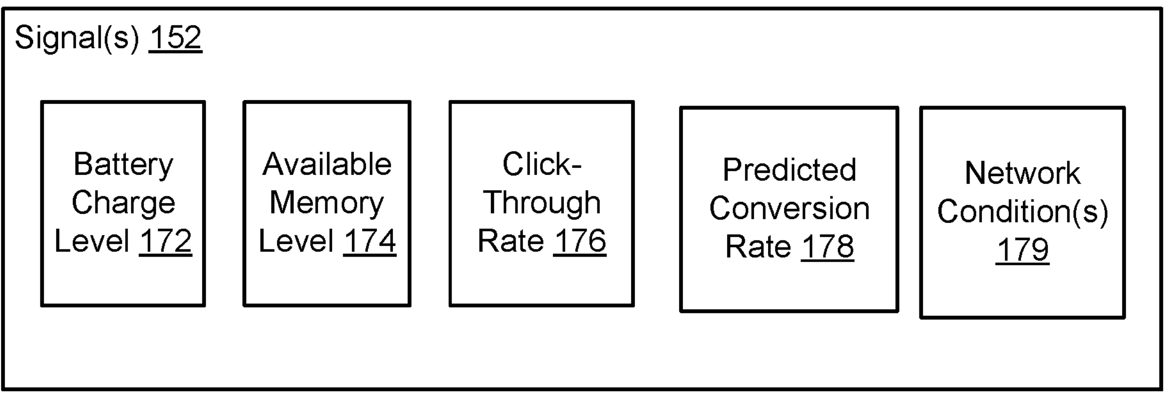
FIG. 1E illustrates examples of signals used to determine whether to pre-launch or prefetch according to an aspect.

The request decision module 148 may determine whether to transmit the initialization request to the initialization API 116 based on one or more signals 152. The signals 152 may include one or more signals generated by the computing device 102. In some examples, the signals 152 may include one or more signals generated by a server computer. FIG. 1E illustrates various examples of signals 152 used to determine whether to pre-launch and/or prefetch. For example, referring to FIG. 1E, the signal(s) 152 may include battery charge level 172, available memory level 174, a network condition (s) 179 of the computing device 102, a click-through rate 176, and/or predicted conversion rate 178.

The battery charge level 172 indicates a current charge level of the battery of the computing device 102. The available memory level 174 indicates a current level of memory of the computing device 102 available to be used. The click-through rate 176 is the ratio of the number of times that the content 144 has been selected by users and the number of times that the content 144 has been shown to users. The predicted conversion rate 178 is that predicted rate at which users will perform a certain goal (e.g., download the application referenced by the content 144). The network condition(s) 179 may include one or more network metrics about the bandwidth/speed of the connection of the computing device 102 to the network 150.

Figure 1F:
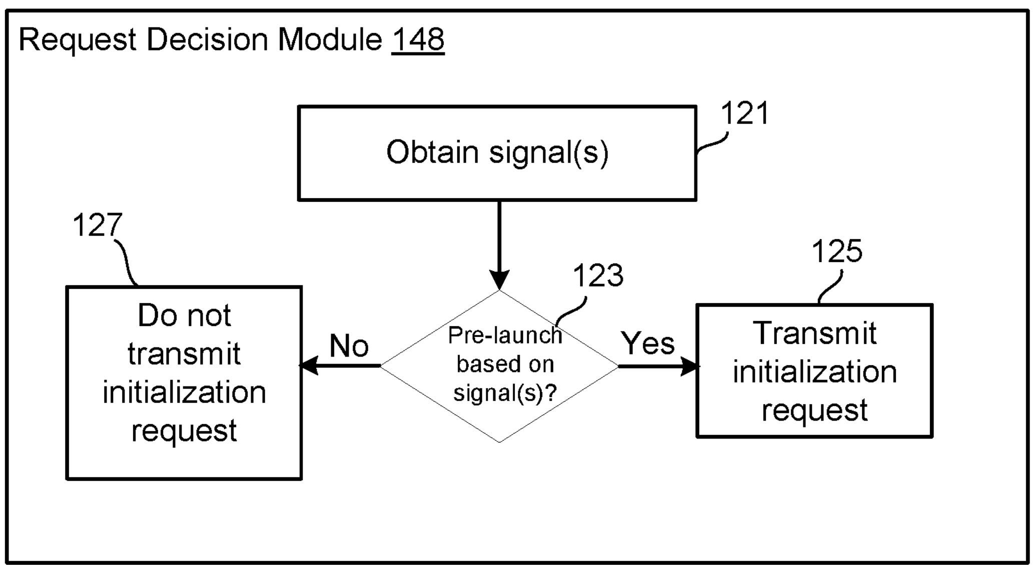
FIG. 1F illustrates an example of a request decision module for determining whether to pre-launch an application according to an aspect.

FIG. 117 illustrates example operations of determining whether to pre-launch the application 108*a* according to an aspect. Referring to FIG. 1F, in operation 121, the request decision module 148 may obtain one or more signals 152. In some examples, the request decision module 148 may obtain the signal(s) 152 in response to the content 144 of the application 108*b* being displayed on the display 142 (e.g., see FIG. 1B) and before the user has selected the content 144. In some examples, the request decision module 148 may obtain the signal(s) 152 in response to the content 144 being requested. Then, in operation 123, the request decision module 148 may determine whether to pre-launch the application 108*a* based on the signal(s) 152. In some examples, if the battery charge level 172 is below a threshold level (e.g., low battery) and/or if the available memory level 174 is below a threshold level (e.g., low available memory), the request decision module 148 may determine to not pre-launch the application 108*a*. In some examples, if the click-through rate 176 is below a threshold level and/or if the predicted conversion rate 178 is below a threshold level, the request decision module 148 may determine to not pre-launch the application 108*a*.

In some examples, if the battery charge level 172 is above a threshold level, the request decision module 148 may determine to pre-launch. In some examples, if the available memory level 174 is above a threshold level, the request decision module 148 may determine to pre-launch. In some examples, if the click-through rate 176 is above a threshold level, the request decision module 148 may determine to pre-launch. In some examples, if the predicted conversion rate 178 is above a threshold level, the request decision module 148 may determine to pre-launch. In some examples, if the network condition 179 is above a threshold level, the request decision module 148 may determine to pre-launch. In some examples, the request decision module 148 may use any combination of the above signals 152 to determine whether to pre-launch.

In some examples, the request decision module 148 inputs the signal(s) 152 into a scoring algorithm that generates a pre-launch scoring value, and if the pre-launch scoring value is above a threshold value, the request decision module 148 determines to pre-launch the application 108*a*. In some examples, the request decision module 148 may execute a machine learning algorithm that determines whether to pre-launch the application 108*a*. In some examples, the machine learning algorithm includes a neural network.

If the request decision module 148 determines to pre-launch (Yes), in operation 125, the application 108*b* may transmit the initialization request 126. For example, the application 108*b* may transmit the initialization request 126 to the initialization API 116 of the application 108*a*, which causes the application 108*a* to be launched as a background process 106. If the request decision module 148 determines not to pre-launch (No), in operation 127, the application 108*b* may not transmit the initialization request 126, which causes the application 108*a* not to be launched as a background process 106.

Figure 1G:
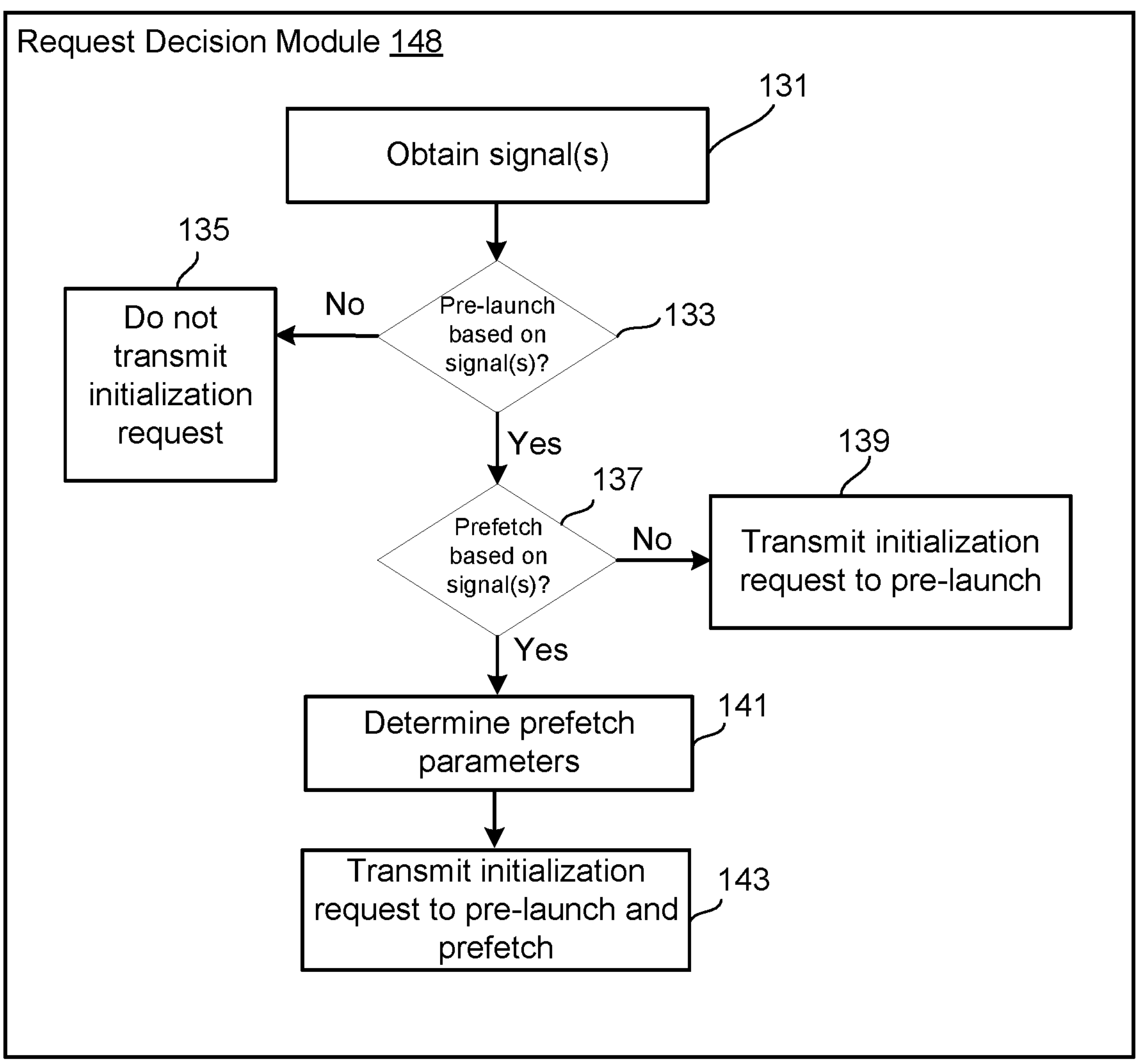
FIG. 1G illustrates an example of a request decision module for determining whether to pre-launch and prefetch according to an aspect.

FIG. 1G illustrates example operations of determining whether to pre-launch and prefetch according to an aspect. Referring to FIG. 1G, in operation 131, the request decision module 148 may obtain one or more signals 152. In some examples, the request decision module 148 may obtain the signal(s) 152 in response to the content 144 of the application 108*b* being displayed on the display 142 (e.g., see FIG. 1B) and before the user has selected the content 144. Then, in operation 133, the request decision module 148 may determine whether to pre-launch the application 108*a* based on the signal(s) 152. The operation 133 may be similar to operation 123 of FIG. 1F and may include any of the details discussed with reference to that operation. If the request decision module 148 determines not to pre-launch (No), in operation 135, the request decision module 148 may not transmit the initialization request 126 to the initialization API 116.

If the request decision module 148 determines to pre-launch (Yes), in operation 137, the request decision module 148 may determine whether to prefetch based on the signal (s) 152. In some examples, the request decision module 148 may use the network condition(s) 179 to determine whether to prefetch content 105. For example, if a network condition 179 (e.g., bandwidth/speed) of the device's connection to the network 150 is below a threshold level, the request decision module 148 may determine to not prefetch the content 105. However, if the network condition 179 is equal to or greater than the threshold level, the request decision module 148 may determine to prefetch the content 105. In some examples, the request decision module 148 may use another signal 152 (or a number of signals 152) to determine whether to prefetch the content 105. For example, the request decision module 148 may compare one or more of the signals 152 to one or more thresholds, use a scoring algorithm, or use a machine learning algorithm to determine whether to prefetch the content 105.

If the request decision module 148 determines not to prefetch (137, No), in operation 139, the application 108*b* transmits the initialization request 126 to the application 108*a*, where the initialization request 126 indicates to only pre-launch the application 108*a*. For example, the application 108*b* may transmit the initialization request 126 to the initialization API 116 of the application 108*a* without the prefetch parameter(s) 132. If the request decision module 148 determines to prefetch (137, Yes), in operation 141, the application 108*b* determines the prefetch parameter(s) 132. The prefetch parameter(s) 132 may identify the content 105 to be prefetched and/or the source(s) of where the content 105 is to be retrieved. In some examples, the prefetch parameter(s) 132 includes an identifier of a resource (e.g., product, application, service, etc.) referenced by the content 144. In some examples, the prefetch parameter(s) 132 includes an application identifier. In some examples, the prefetch parameter(s) 132 include a product or service identifier. In some examples, the prefetch parameter(s) 132 include a uniform resource locator (URL).

In operation 143, the application 108*b* transmits the initialization request 126 with the prefetch parameter(s) 132 to the initialization API 116 of the application 108*a*. In some examples, separate requests are transmitted for the pre-launching and prefetching. For example, in response to the determination that application 108*a* should be pre-launched, the application 108*b* can transmit a first request to the initialization API 116, and, in response to the determination that application 108*a* should prefetch content 105, the application 108*b* can transmit a second request to the initialization API 116 with the prefetch parameter(s) 132.

In some examples, the signals 152 include a user control signal. For example, a user may be able to opt out of pre-launching/prefetching. If the request decision module 148 receives a signal that indicates that the user has opted out of pre-launching, the request decision module 148 may determine to not transmit the initialization request 126 (e.g., to not pre-launch the application 108*a*). In some examples, the signals 152 include a signal that indicates a number of times that the device has pre-launched an application 108 over a period of time (e.g., past hour, etc.). If the number of times exceeds a threshold, the request decision module 148 may determine to not transmit the initialization request 126 (e.g., skip pre-launching/prefetching if the device initiated pre-launching at least X times over the past hour).

Upon receipt of the initialization request 126 at the initialization API 116 of the application 108*a*, the application 108*a* can be pre-launched as a background process 106. Also, in some examples, the initialization request 126 may include prefetch parameter(s) 132, which would instruct the application 108*a* to prefetch and store content 105. In some examples, the application 108*b* includes a termination decision module 149 to determine whether to terminate the background process 106 executing the application 108*a*. For example, if the termination decision module 149 determines to terminate the background process 106, the application 108*b* may transmit a termination request 129 to the initialization API 116, which causes the operation system 104 to terminate the background process 106 that is executing the application 108*a*. In some examples, the termination request 129 causes the application 108*b* and the application 108*a* to become un-binded (e.g., interprocess communication connection 111 being terminated). In some examples, the termination decision module 149 transmits the termination request 129 when the content 144 is not displayed in the application 108*b* (e.g., the user has moved the content 144 off the screen) or a timer 151 has expired. In some examples, the termination decision module 149 transmits the termination request 129 when the user closes the application 108*b*. In this manner, memory that has been allocated to the background process 106 that is executing the application 108*a* can be available for other programs since there is a relatively good chance that the user will not select the content 144.

Figure 1H:
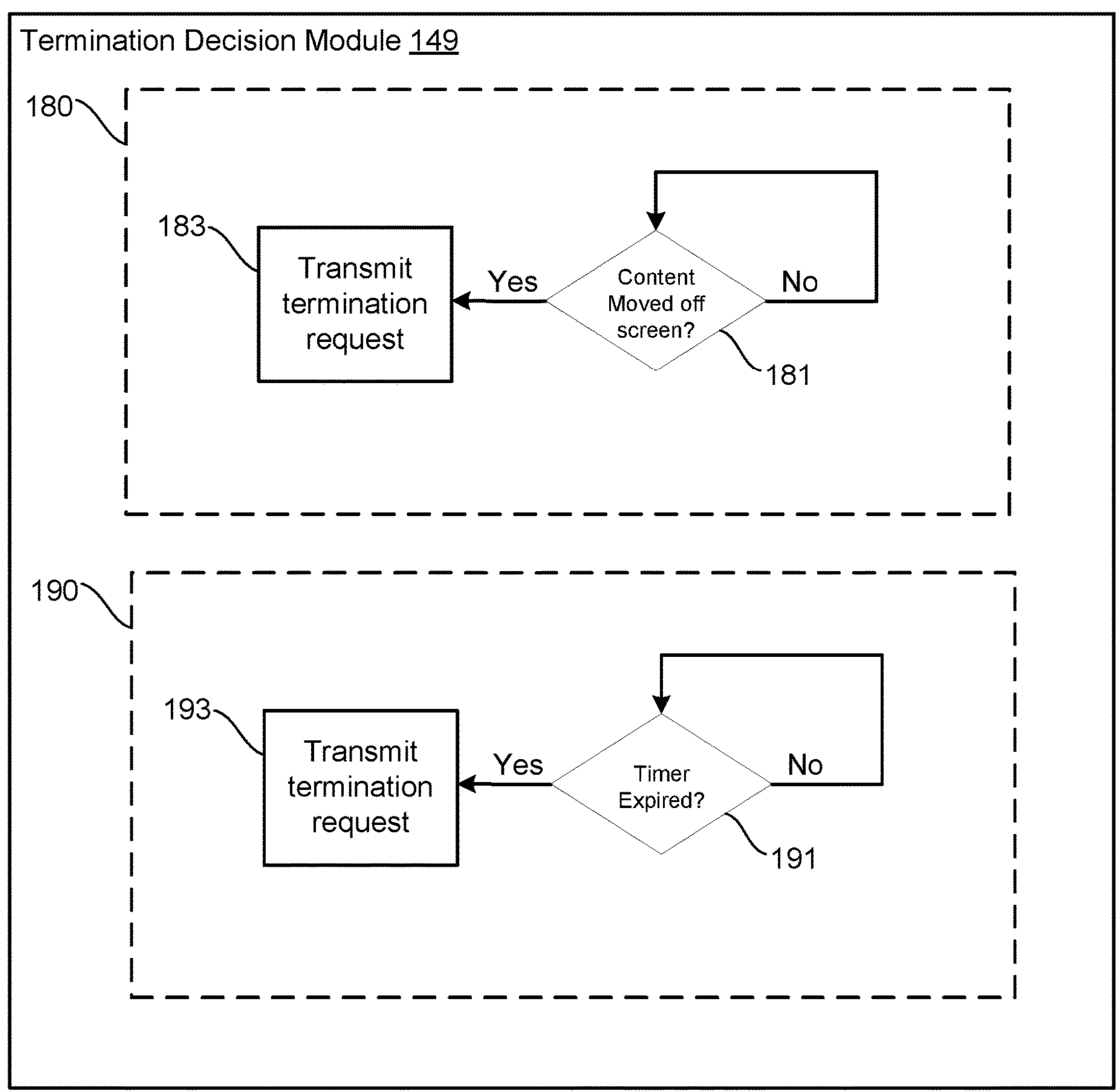
FIG. 1H illustrates an example of a termination decision module for determining whether to transmit a termination request to terminate a background process that is pre-launching the application according to an aspect.

FIG. 1H illustrates example operations of the termination decision module 149. Referring to FIG. 1H, the termination decision module 149 may execute a process 180 and a process 190. In some examples, the process 190 is executed in parallel with the process 180.

With respect to process 180, in operation 181, the termination decision module 149 determines (e.g., continuously or periodically) whether the content 144 is no longer displayed on the display 142 (e.g., whether the content has moved off the screen). If the content 144 is still displayed on the display 142 (No), the termination decision module 149 continues to monitor whether the content 144 has moved off the display 142. If the content 144 is no longer displayed on the display (Yes), in operation 183, the termination decision module 149 transmits the termination request 129 to the initialization API 116 of the application 108*a*. In response to the receipt of the termination request 129 at the initialization API 116, the background process 106 that is executing the application 108*a* is terminated (or closed). In some examples, in response to the receipt of the termination request 129 at the initialization API 116, the interprocess communication connection 111 is terminated, which causes the background process 106 that is executing the application 108*a* to be terminated. In other words, the interprocess communication connection 111 is established in response to the receipt of the initialization request 126, and the interprocess communication connection 111 remains active until a termination request 129 is received at the initialization API 116. While the interprocess communication connection 111 is active, the application 108*a* and the application 108*b* can communicate with each other. However, in response to receipt of the termination request 129, the interprocess communication connection 111 is deactivated (e.g., terminated), which causes the underlying service (e.g., the pre-launching service) to be terminated.

With respect to process 190, in operation 191, the termination decision module 149 determines whether a timer 151 has expired. The timer 151 may be set to any length of time such as 30 seconds, one minute, two minutes, five minutes, etc. The initiation of the timer 151 may start in response to the time at which the application 108 is pre-launched and/or the time at which the interprocess communication connection 111 is established (e.g., created or activated). If the termination decision module 149 determines that the timer has not expired (No), the termination decision module 149 continues to determine whether the timer has expired. If the termination decision module 149 determines that the timer has expired (Yes), in operation 193, the termination decision module 149 transmits the termination request 129 to the initialization API 116 of the application 108*a*. In response to the receipt of the termination request 129 at the initialization API 116, the background process 106 that is executing the application 108*a* is terminated (or closed). Processes 180 and 190 ensure that system resources consumed by pre-launching application 108*a* are freed as early as possible, e.g., once a user is no longer likely to or cannot select content 144. This ensures the computing device 102 operates efficiently while still reducing latency for loading application 108*a* if a user does select content 144.

Figure 2:
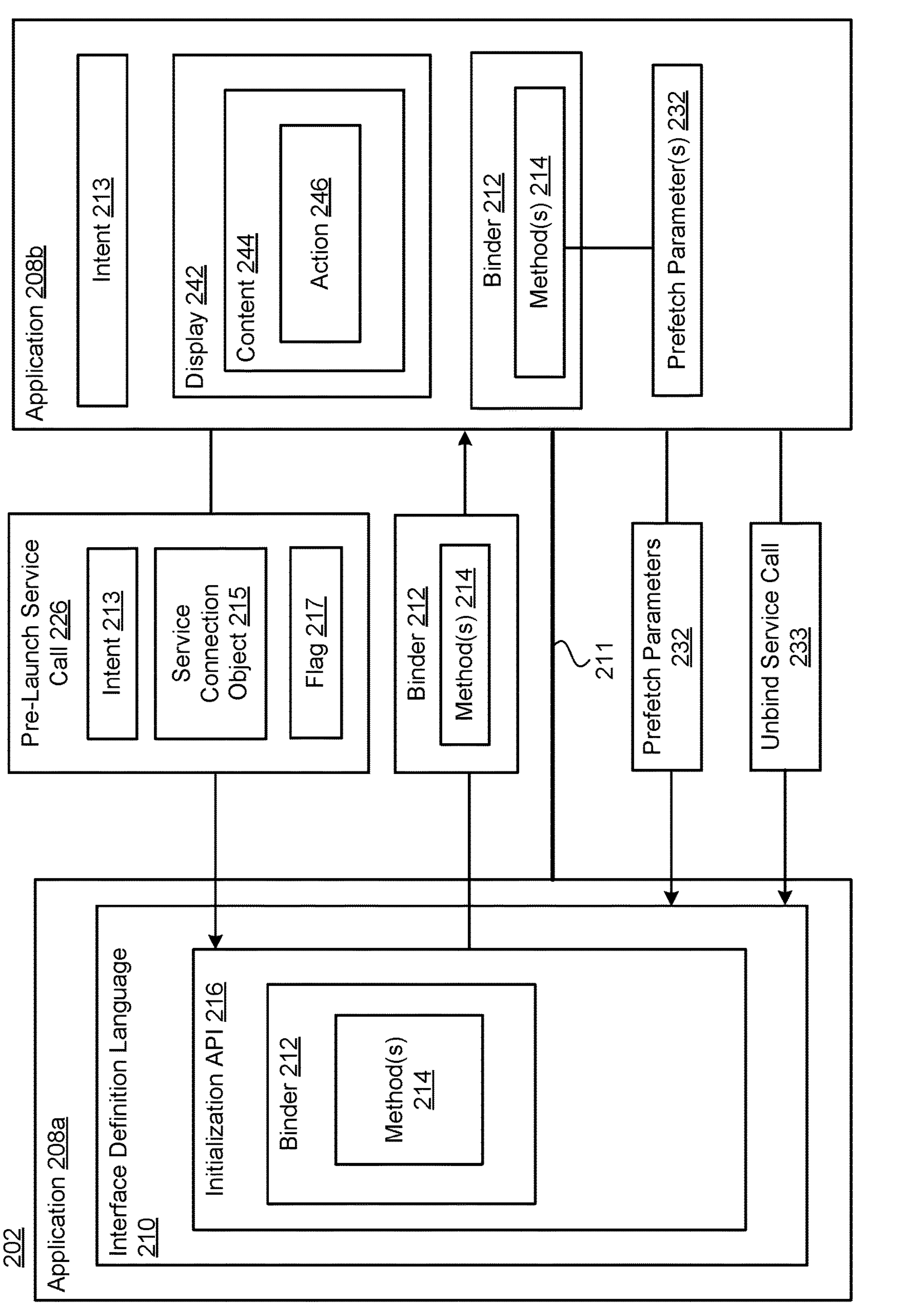
FIG. 2 illustrates a diagram of a computing device configured to enable an application to pre-launch another application using interprocess communication according to an aspect.

FIG. 2 illustrates a computing device 202 that enables one application (e.g., application 108*b*) to pre-launch another application (e.g., application 108*a*) as a background process before the user has selected content 244 that requires an action 246 of the application 108*a*. The computing device 202 of FIG. 2 may be an example of the system of FIGS. 1A through 1H and may include any of the details discussed with reference to those figures. For example, the application 208*a* and the application 208*a* may be examples of the application 108*a* of FIGS. 1A through 1H and the application 108*b* of FIGS. 1A through 1H, respectively.

The application 208*a* includes an interface definition language 210 that defines an initialization API 216 (e.g., a pre-launch API) that is used by a calling application (e.g., application 208*b*) to pre-launch the application 208*a* in advance of an action taken with respect to content 244 of application 208*b*, where the application 208*b* is executing as a foreground process of an operating system of the computing device 202. For example, in response to the content 244 being displayed on the display 242, the application 208*b* may call the initialization API 216 by transmitting a pre-launch service call 226 to the initialization API 216. The pre-launch service call 226 may be an example of the initialization request 126 of FIGS. 1A through 1H.

In further detail, in response to the content 244 being displayed on the display 242 (or in response to the request decision module 148 of FIGS. 1A through 1H determining to pre-launch the application 208*a*), the application 208*b* may create an intent 213 that references the initialization API 216 defined in the interface definition language 210. The intent 213 may be an abstract description of the pre-launch operation to be performed. Then, the application 208*b* transmits a pre-launch service call 226 to the initialization API 216, where the pre-launch service call 226 includes the intent 213, a service connection object 215, and a flag 217. In some examples, the pre-launch service call 226 is a bind service method that binds the application 208*b* to the pre-launch service of the initialization API 216. In some examples, the service connection object 215 defines an interface for monitoring the state of the pre-launch service. In some examples, the flag 217 is a flag that, when set, automatically creates the pre-launch service as long as the binding exists (e.g., when the interprocess communication connection 211 is active).

In response to receipt of the pre-launch service call 226, the application 208*a* is launched as a background process of the operating system of the computing device 202. Also, in response to receipt of the pre-launch service call 226, the application 208*a* obtains a binder 212 (e.g., a service instance) (defined in the interface definition language) and returns the binder 212 to the application 208*b*. The binder 212 may define one or more methods 214 that the application 208*b* uses (e.g., invokes) to transmit information to the application 208*a*. The interprocess communication connection 211 may be established in response to receipt of the binder 212. The interprocess communication connection 211 may remain active until an unbind service call 233 is received at the initialization API 216, where the unbind service call 233 terminates the interprocess communication connection 211. The unbind service call 233 may be an example of the termination request 129 of FIGS. 1A through 1H. During the time the interprocess communication connection 211 remains active, the application 208*b* can invoke a method 214 defined by the binder 212 to transmit information to the application 208*a*.

According to the embodiments discussed herein, the unbind service call 233 is delayed because application 208*a* would need to be running by the time the user selects the content 244. For example, the unbind service call 233 is delayed until a timer (e.g., timer 151 of FIG. 1A) has expired or the content 244 is not displayed in the foreground process. In other words, the application 208*b* (e.g., the termination decision module 149 of FIG. 1A) determines whether the content 244 has moved off the screen or whether a timer has expired, and if the content 244 has moved off the screen or the timer has expired, the application 208*b* transmits the unbind service call 233 to terminate the interprocess communication connection 211, which causes the background process that is executing the application 208*a* to be terminated.

In some examples, before the unbind service call 233 is transmitted to the initialization API 216 of the application 208*a*, one or more prefetch parameters 232 can be passed to the application 208*a* by invoking a method 214 defined by the binder 212. For example, as indicated above, the application 208*a* returns a binder 212 to the application 208*b* in response to the pre-launch service call 226, where the binder 212 defines one or more methods 214 that are invoked by the application 208*b* to pass information to the application 208*a*. In some examples, the application 208*b* uses one or more of the methods 214 to call the initialization API 216 to provide the application 208*a* with the prefetch parameter(s) 232.

Figure 3:
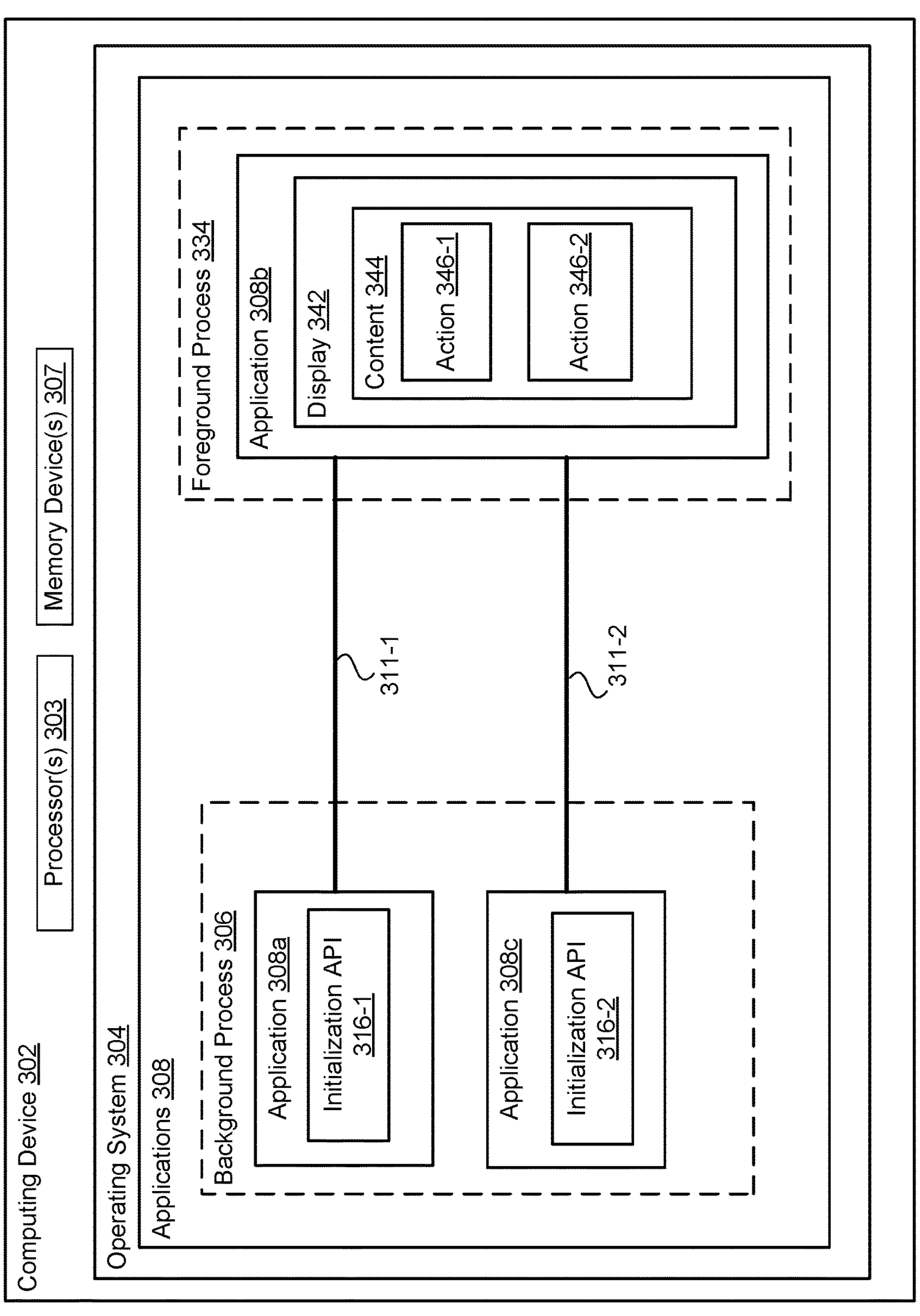
FIG. 3 illustrates a diagram of a computing device configured to enable an application to pre-launch another application using interprocess communication according to another aspect.

FIG. 3 illustrates a computing device 302 having an application (e.g., 308*b*) that can cause two applications (e.g., application 308*a*, application 308*c*) to be pre-launched and/or prefetched according to an aspect. The computing device 302 may be an example of the computing device 102 of FIGS. 1A through 1H and/or the computing device 202 of FIG. 2 and may include any of the details discussed with respect to those figures. For example, the computing device 302 may include one or more processors 303, one or more memory devices 307, an operating system 304, and applications 308 (e.g., application 308*a*, application 308*b*, application 308*c*).

As shown in FIG. 3, the application 308*b* may be executing as a foreground process 334, where the application 308*b* displays content 344 on a display 342 of the computing device 302. The content 344 may be associated with an action 346-1 of application 308*a* and with an action 346-2 of application 308*c*. In some examples, when the content 344 of the application 308*b* is displayed on the display 342 (which is before the user has selected the content 344), the application 308*b* may transmit a first initialization request (e.g., the initialization request 126 of FIGS. 1A through 1H) to an initialization API 316-1 of the application 308*a*, and may transmit a second initialization request (e.g., the initialization request 126 of FIGS. 1A through 1H) to an initialization API 316-2 of the application 308*c*. The initialization API 316-1 is defined at an interface definition language of the application 308*a*. The initialization API 316-2 is defined at an interface definition language of the application 308*c*. In some examples, the second initialization request and the first initialization request are transmitted at least partially in parallel with each other. In some examples, the first initialization request includes one or more prefetching parameters to cause the application 308*a* to prefetch content. In some examples, the second initialization request includes one or more prefetching parameters to cause the application 308*c* to prefetch content.

The first initialization request is received at the initialization API 316-1, which causes the application 308*a* to be launched as a background process 306. In some examples, the receipt of the first initialization request causes the creation (or establishment) of a first IPC connection 311-1 between the application 308*a* and application 308*b* to enable the application 308*a* and the application 308*b* to communicate with each other. The second initialization request is received at the initialization API 316-2, which causes the application 308*c* to be launched as a background process 306. In some examples, the receipt of the second initialization request causes the creation (or establishment) of a second IPC connection 311-2 between the application 308*c* and application 308*b* to enable the application 308*c* and the application 308*b* to communicate with each other. Then, when receipt of a user action is taken with respect to the content 344, the application 308*a* and/or the application 308*c* may be switched to the display 242 in a relatively quick fashion since both of these applications were pre-launched.

Figure 4A:
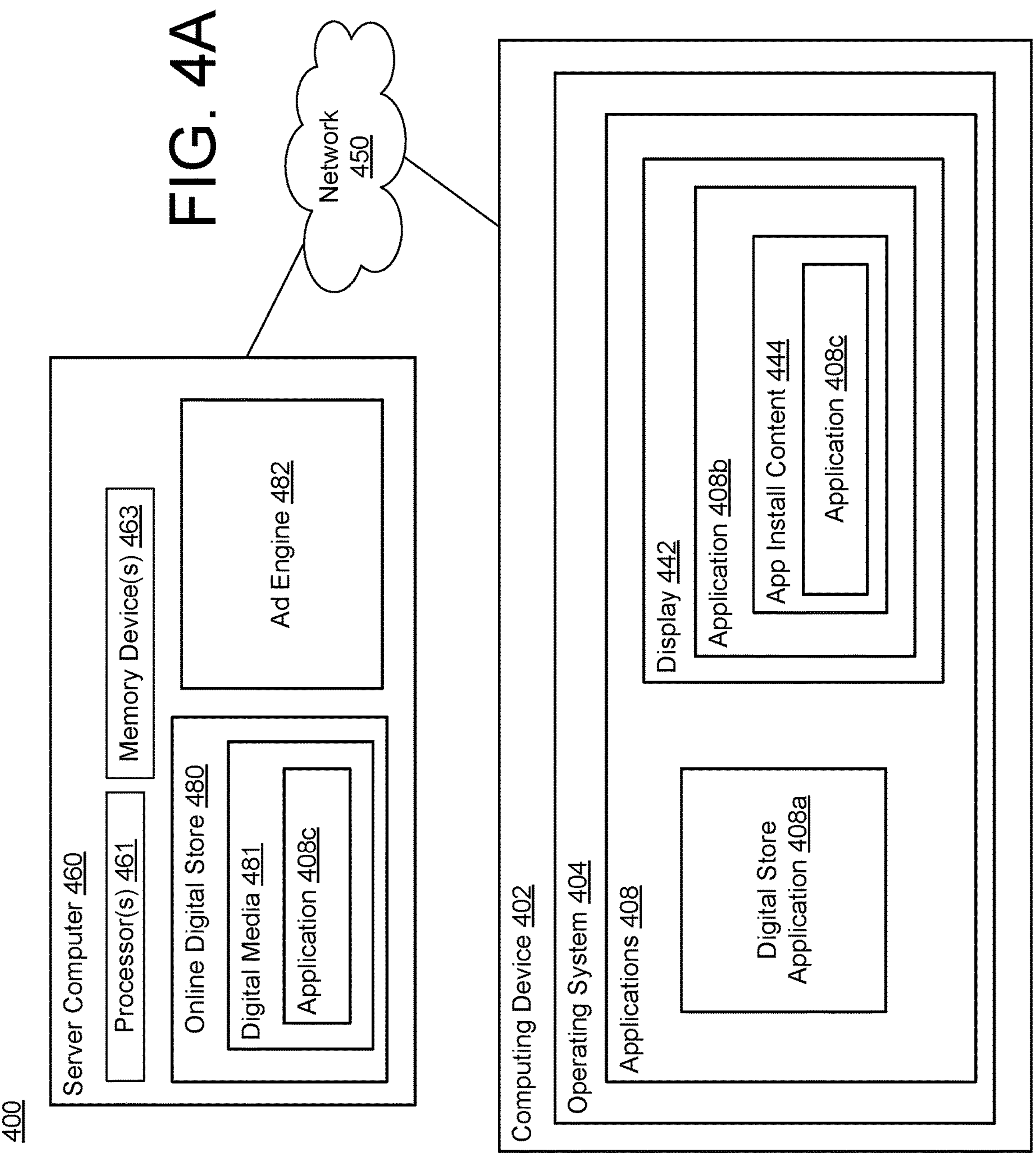
FIG. 4A illustrates a system that enables an application to pre-launch a digital store application using interprocess communication according to an aspect.
Figure 4B:
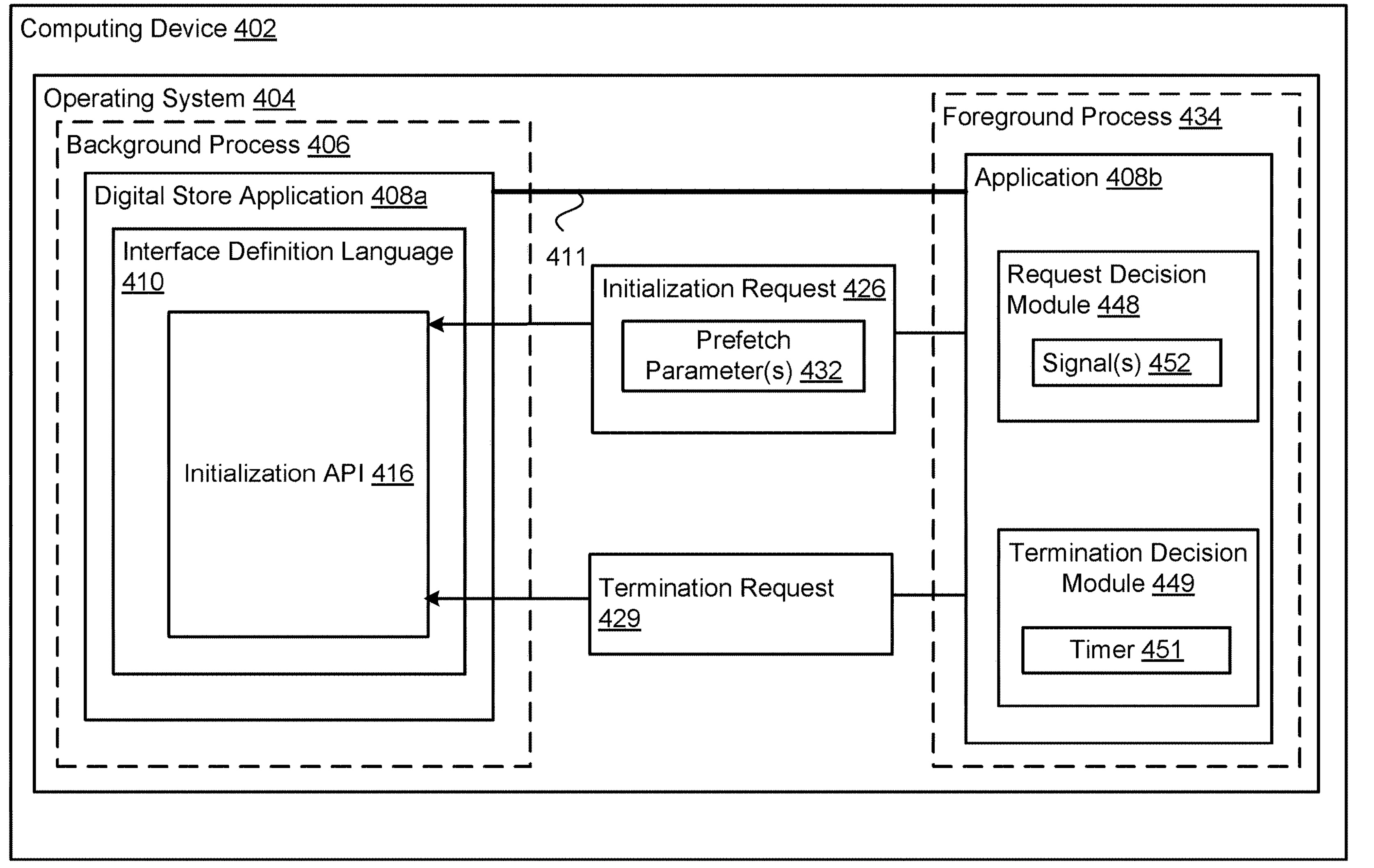
FIG. 4B illustrates a computing device that enables an application to pre-launch a digital store application using interprocess communication according to an aspect.

FIGS. 4A and 4B illustrate a system 400 that enables an application (e.g., application 408*b*) to pre-launch another application (e.g., digital store application 408*a*) and/or causes the digital store application 408*a* to prefetch content. The system 400 may be an example of the system 100 of FIGS. 1A through 1H, the computing device 202 of FIG. 2, and/or the computing device 302 of FIG. 3 and may include any of the details discussed with reference to those figures. For example, the system 400 may include a server computer 460 having one or more processors 461, one or more memory devices 463, an online digital store 480 that stores digital media 481 in which users can download and install, and an ad engine 482 configured to insert app install content 444 into applications. The system 400 includes a computing device 402 configured to communicate with the server computer 460 over a network 450. The computing device 402 includes an operating system 404 that executes a number of applications 408 includes a digital store application 408*a* and an application 408*b*.

The application 408*b* may be displaying app install content 444 on the display 442 of the computing device 402, where the application 408*b* is executing as the foreground process 434. For example, the app install content 444 may reference another application (e.g., application 408*c*) that is not installed on the computing device 402, but when selected, causes the operating system 404 to launch the digital store application 408*a* so that the user can download and install the application 408*c* referenced by the app install content 444. In some examples, the selection of the app install content 444 causes an action of launching the digital store application 408*a*.

In advance of a user action taken with respect to the app install content 444 (e.g., before the user selects the ad), the application 408*b* causes the digital store application 408*a* to be pre-launched as a background process 406 of the operating system 404. The digital store application 408*a* defines an interface definition language 410. The interface definition language 410 defines a programming interface that permits the digital store application 408*a* to communicate with other applications 408 including application 408*b*. According to the embodiments discussed herein, the interface definition language 410 defines an initialization API 416 in which a calling application (e.g., application 408*b*) uses to call the pre-launch service. In other words, the initialization API 416 (e.g., also referred to as a pre-launch API) defines a pre-launch interface that can be used by other applications 408 (e.g., application 408*b*) to pre-launch the digital store application 408*a* as a background process 406.

In some examples, when the app install content 444 of the application 408*b* is displayed on the display 442 (which is before the user has selected the app install content 444), the application 408*b* may transmit an initialization request 426 to the digital store application 408*a*. The initialization request 426 is received at the initialization API 416, which causes the digital store application 408*a* to be launched as a background process 406. In some examples, the receipt of the initialization request 426 causes the creation (or establishment) of an interprocess communication (IPC) connection 411 between the digital store application 408*a* and the application 408*b* to enable the digital store application 408*a* and the application 408*b* to communicate with each other.

The IPC connection 411 is a communication protocol that allows processes to communicate with each other and synchronize their actions. In some examples, receipt of the initialization request 426 binds the digital store application 408*a* and the application 408*b* (e.g., the digital store application 408*a* and the application 408*b* are linked) so that information can be exchanged between the digital store application 408*a* and the application 408*b*. In some examples, the digital store application 408*a* and the application 408*b* are linked according to the techniques described with reference to FIG. 2. While the interprocess communication connection 411 remains active, the digital store application 408*a* and the application 408*b* can communicate with each other. In some examples, if the interprocess communication connection 411 is terminated (e.g., deactivated), the underlying service (e.g., the pre-launching service) is terminated, thereby causing the background process 406 executing the digital store application 408*a* to be terminated.

Then, when receipt of a user action is taken with respect to the app install content 444, the digital store application 408*a* may load more quickly, thereby reducing the latency of displaying information associated with the digital store application 408*a*. For example, when the app install content 444 is selected, the digital store application 408*a* can be quickly loaded into the display 442 (in the foreground process 434), where the latency of rendering the digital store application 408*a* can be reduced (e.g., significantly reduced) because the digital store application 408*a* is pre-launched as a background process 406.

In some examples, the initialization request 426 specifies one or more prefetch parameter(s) 432. In some examples, the prefetch parameter(s) 432 may provide an application identifier for application 408*c* referenced by the app install content 444, and the digital store application 408*a* may prefetch details about the application 408*c* such as the name, downloads, ratings, and/or reviews, etc. For example, if the initialization request 426 specifies one or more prefetch parameters 432, the digital store application 408*a* can prefetch content according to the prefetch parameter(s) 432 as a background process 406 and store (e.g., cache) the content in memory in advance of a user action taken with respect to the app install content 444 (e.g., before the user selects the ad). Then, when the user selects the app install content 444, the display 442 can be quickly switched to the digital store application 408*a* (e.g., because the digital store application 408*a* is pre-launched), where the digital store application 408*a* quickly displays the prefetched content.

In some examples, the application 408*b* includes a request decision module 448 that determines whether the application 408*b* should transmit the initialization request 426 to the initialization API 416 to pre-launch and/or prefetch. In some examples, the request decision module 448 determines whether to transmit the initialization request to the initialization API 416 based on one or more signals 452. The signals 452 may be any of the signals 152 described with reference to FIGS. 1A through 1H. The request decision module 448 may perform any of the operations described with reference to FIGS. 1A through 1H.

Upon receipt of the initialization request 426 at the initialization API 4/6 of the digital store application 408*a*, the digital store application 408*a* can be pre-launched as a background process 406. Also, in some examples, the initialization request 426 may include prefetch parameter(s) 432, which would instruct the digital store application 408*a* to prefetch and store content. In some examples, the application 408*b* includes a termination decision module 449 to determine whether to terminate the background process 406 executing the digital store application 408*a*. For example, if the termination decision module 449 determines to terminate the background process 406, the application 408*b* may transmit a termination request 429 to the initialization API 416, which causes the background process 406 to be terminated. In some examples, the termination decision module 449 transmits the termination request 429 when the app install content 444 is not displayed in the application 408*b* (e.g., the user has moved the app install content 444 off the screen) or a timer 451 has expired. In this manner, memory that has been allocated to the background process 406 executing the digital store application 408*a* can be available for other programs since there is a relatively good chance that the user will not select the app install content 444. The termination decision module 449 may perform any of the operations described with reference to the termination decision module 449 of FIGS. 1A through 1H.

Figure 5:
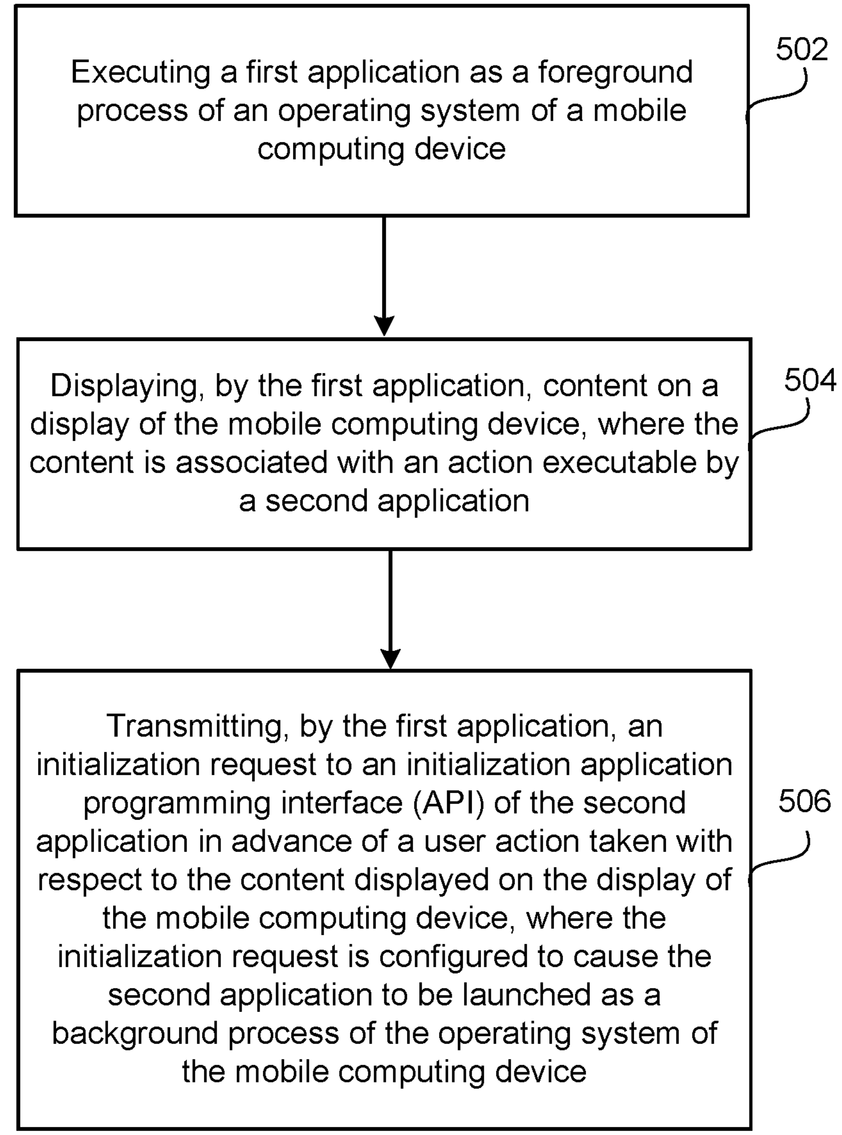
FIG. 5 illustrates a flowchart depicting example operations of pre-launching an application using interprocess communication according to an aspect.

FIG. 5 is a flowchart 500 depicting example operations of pre-launching an application using interprocess communication according to an aspect. Although the flowchart 500 of FIG. 5 is explained with respect to the system 100 of FIGS. 1A through 1H, the flowchart 500 may be applicable to any of the embodiments discussed herein. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. The operations of the flowchart 500 may be from the perspective of a calling application (e.g., application 108*b*, application 208*b*, application 308*b*, application 408*b*).

Operation 502 includes executing a first application 108*b* as a foreground process 134 of an operating system 104 of a computing device 102. Operation 504 includes displaying, by the first application 108*b*, content 144 on a display 142 of the computing device 102, where the content 144 is associated with an action 146 executable by a second application 108*a*. Operation 506 includes transmitting, by the first application 108*b*, an initialization request 126 to an initialization application programming interface (API) 116 of the second application 108*a* in advance of a user action taken with respect to the content 144 displayed on the display 142 of the computing device 102, where the initialization request 126 configured to cause the second application 108*a* to be launched as a background process 106 of the operating system 104 of the computing device 102.

In some examples, the operations include transmitting, by the first application 108*b*, a termination request 129 to the initialization API 116 of the second application 108*a* in response to the content 144 not being displayed on the display 142, where the termination request 129 is configured to cause the background process 106 that is executing the second application 108*a* to be terminated.

In some examples, the operations include transmitting, by the first application 108*b*, a termination request 129 to the initialization API 116 of the second application 108*a* in response to an expiration of a timer 151, where the termination request 129 configured to cause the background process 106 that is executing the second application 108*a* to be terminated.

In some examples, the initialization request 126 is configured to cause an interprocess communication connection 111 to be established between the first application 108*b* and the second application 108*a* to enable the first application 108*b* and the second application 108*a* to communicate with each other.

In some examples, the operations include transmitting, by the first application 108*b*, a termination request 129 to the initialization API 116 of the second application 108*a* in response to the content 144 not being displayed on the display 142 or in response to an expiration of a timer 151, where the termination request 129 is configured to terminate the interprocess communication connection 111.

In some examples, the operations include determining, by the second application 108*a*, whether to transmit the initialization request 126 to the initialization API 116 of the second application 108*a* based on at least one signal 152.

In some examples, the at least one signal 152 includes a battery charge level 172, where the initialization request 126 is transmitted in response to the battery charge level 172 being greater than a threshold level. In some examples, at least one signal 152 includes an available memory level 174, where the initialization request 126 is transmitted in response to the available memory level 174 being greater than a threshold level. In some examples, the at least one signal 152 includes a click-through rate 176 associated with the content 144 displayed by the first application 108*b*, where the initialization request 126 is transmitted in response to the click-through rate 176 being greater than a threshold level. In some examples, the at least one signal 152 includes a predicted conversion rate 178 associated with the content 144 displayed by the first application 108*b*, where the initialization request 126 is transmitted in response to the predicted conversion rate 178 being greater than a threshold level. In some examples, the at least one signal 152 includes a network condition 179 of the computing device 102, where the initialization request 126 is transmitted in response to the network condition 179 being greater than a threshold level. In some examples, the initialization request 126 includes at least one prefetching parameter 132 to enable the first application 108*b* to prefetch content 105 over a network 150 from a server computer 160 as a background process 106.

Figure 6:
FIG. 6 illustrates a flowchart depicting example operations of pre-launching an application using interprocess communication according to another aspect.
Figure 6:
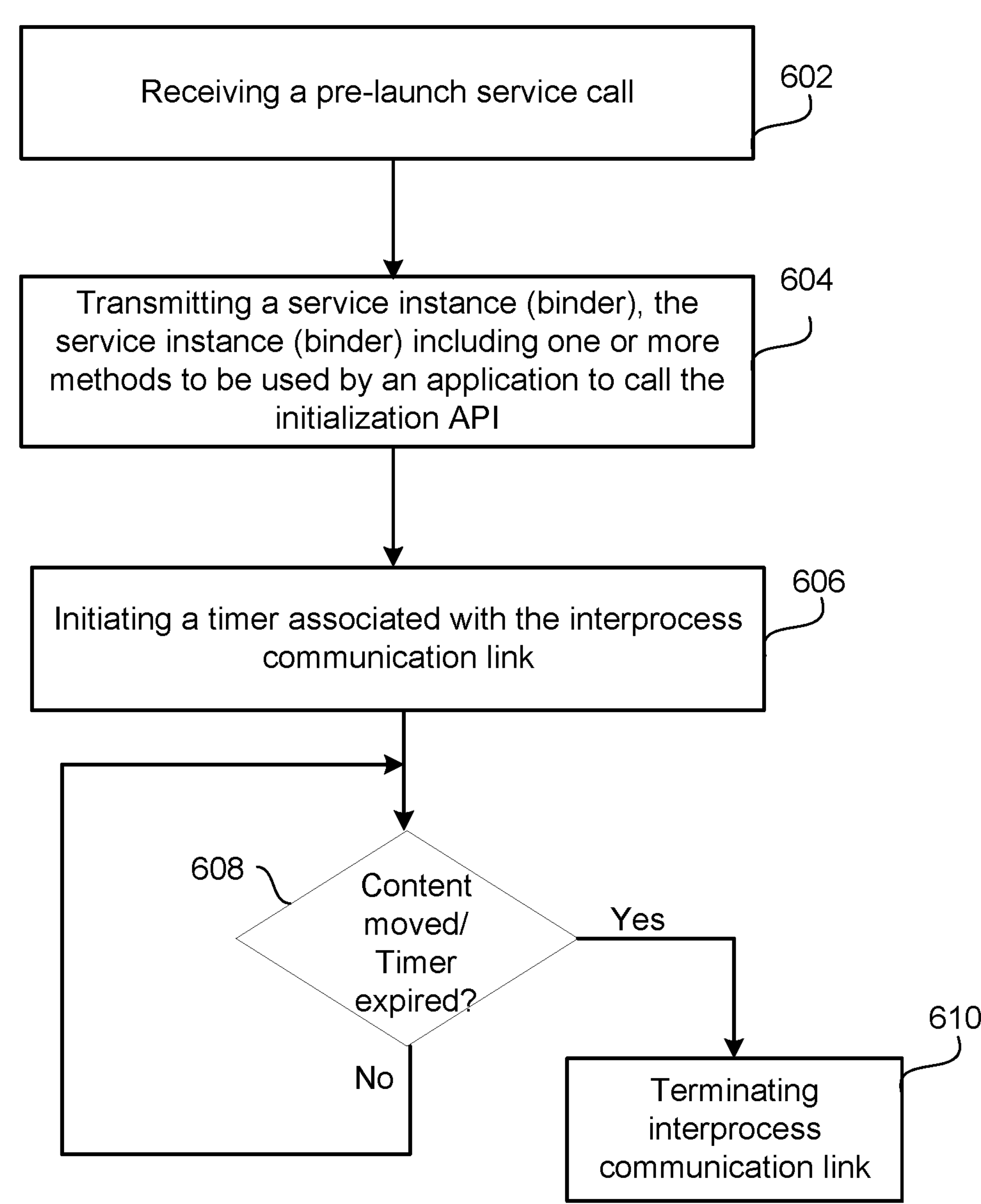

FIG. 6 is a flowchart 600 depicting example operations of pre-launching an application using interprocess communication according to an aspect. Although the flowchart 600 of FIG. 6 is explained with respect to the computing device 202 of FIG. 2, the flowchart 600 may be applicable to any of the embodiments discussed herein. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion. The operations of the flowchart 600 may be from the perspective of a calling application (e.g., application 108*b*, application 208*b*, application 308*b*, application 408*b*).

Operation 602 includes receiving a pre-launch service call 226. For example, the initialization API 216 of the application 208*a* receives the pre-launch service call 226 from the application 208*b* in response to the determination that the application 208*a* would be pre-launched (which is in advance of a user action taken with respect to content 244 of an application 208*b* displayed on a display 242 of a computing device 202. In some examples, the pre-launch service call 226 includes the intent 213, the service connection object 215, and the flag 217. In some examples, receipt of the pre-launch service call 226 causes the application 208*a* to be pre-launched.

Operation 604 includes transmitting a service instance (e.g., a binder 212), where the service instance (e.g., the binder 212) includes one or more methods 214 to be used by an application (e.g., application 208*a*) to call the initialization API 216. In some examples, receipt of the service instance causes the interprocess communication connection 211 to be established where the application 208*a* and the application 208*b* can communicate with each other while the interprocess communication connection 211 is active.

Operation 606 includes initiating a timer (e.g., timer 151 of FIG. 1A) associated with the interprocess communication connection 211. In some examples, the timer is initiated when the interprocess communication connection 211 is established. In some examples, the timer defines a duration which can be any value such as 30 seconds, one minute, two minutes, 5 minutes, etc.

Operation 608 includes determining whether the content 244 has moved off the screen or whether the timer has expired. For example, the application 208*b* monitors the timer and whether the content 244 is still displayed on the display 242 or whether it is no longer being displayed. If no, the process returns to operation 608 to continue to determine whether the content 244 has moved off the screen or whether the timer has expired. If yes, the process continues to operation 610.

Operation 610 includes terminating the interprocess communication connection 211. In some examples, the application 208*b* transmits an unbind service call 233 to the initialization API 216, which causes the background process that is executing the application 208*b* to be terminated.

Figure 7:
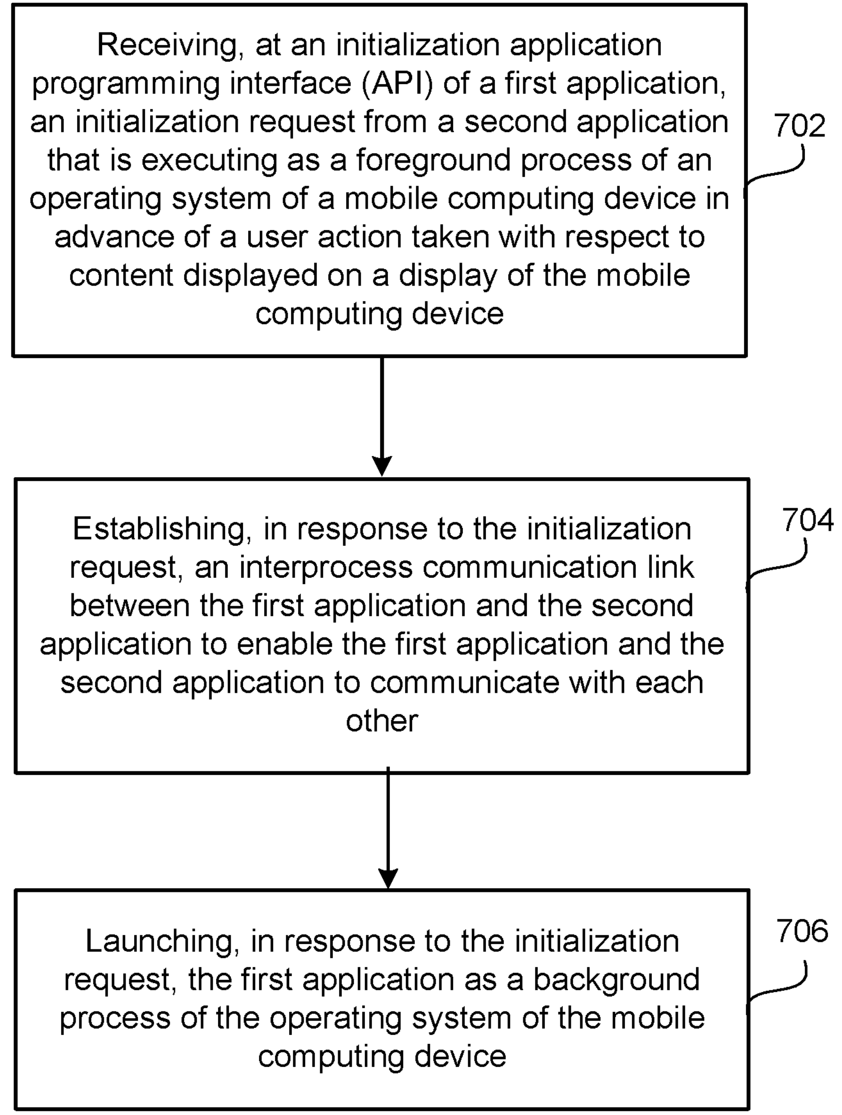
FIG. 7 illustrates a flowchart depicting example operations of pre-launching an application using interprocess communication according to another aspect.

FIG. 7 is a flowchart 700 depicting example operations of pre-launching an application using interprocess communication according to an aspect. Although the flowchart 700 of FIG. 7 is explained with respect to the system 100 of FIGS. 1A through 1H, the flowchart 700 may be applicable to any of the embodiments discussed herein. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. The operations of the flowchart 700 are from the perspective of a linked application (e.g., application 108*a*, application 208*a*, application 308*a*, digital store application 408*a*).

Operation 702 includes receiving, at an initialization application programming interface (API) 116 of a first application 108*a*, an initialization request 126 from a second application 108*b* that is executing as a foreground process 134 of an operating system 104 of a computing device 102 in advance of a user action taken with respect to content 144 displayed on a display 142 of the computing device 102.

Operation 704 includes establishing, in response to the initialization request 126, an interprocess communication connection 111 between the first application 108*a* and the second application 108*b* to enable the first application 108*a* and the second application 108*b* to communicate with each other. Operation 706 includes launching, in response to the initialization request 126, the first application 108*a* as a background process 106 of the operating system 104 of the computing device 102.

Although the disclosed inventive concepts include those defined in the attached claims, it should be understood that the inventive concepts can also be defined in accordance with the following embodiments:

Embodiment 1 is a method for pre-launching an application using interprocess communication, the method comprising executing a first application as a foreground process of an operating system of a computing device, displaying, by the first application, content on a display of the computing device, and transmitting, by the first application, an initialization request to an initialization application programming interface (API) of a second application in advance of a user action taken with respect to the content displayed on the display.

Embodiment 2 is the method of embodiment 1, wherein the content is associated with an action executable by the second application.

Embodiment 3 is the method of any of embodiments 1 through 2, wherein the computing device is a mobile computing device.

Embodiment 4 is the method of any of embodiments 1 through 3, wherein the initialization request is configured to cause the second application to be launched as a background process of the operating system of the computing device.

Embodiment 5 is the method of any of embodiments 1 through 4, further comprising transmitting, by the first application, a termination request to the initialization API of the second application in response to the content not being displayed on the display.

Embodiment 6 is the method of any of embodiments 1 through 5, wherein the termination request is configured to cause the background process that is executing the second application to be terminated.

Embodiment 7 is the method of any of embodiments 1 through 6, further comprising transmitting, by the first application, a termination request to the initialization API of the second application in response to an expiration of a timer.

Embodiment 8 is the method of any of embodiments 1 through 7, wherein the initialization request is configured to cause an interprocess communication connection to be established between the first application and the second application to enable the first application and the second application to communicate with each other.

Embodiment 9 is the method of any of embodiments 1 through 8, further comprising transmitting, by the first application, a termination request to the initialization API of the second application in response to the content not being displayed on the display or in response to an expiration of a timer.

Embodiment 10 is the method of any of embodiments 1 through 9, wherein the termination request is configured to terminate the interprocess communication connection.

Embodiment 11 is the method of any of embodiments 1 through 10, further comprising determining, by the second application, whether to transmit the initialization request to the initialization API of the second application based on at least one signal.

Embodiment 12 is the method of any of embodiments 1 through 11, wherein the at least one signal includes a battery charge level.

Embodiment 13 is the method of any of embodiments 1 through 12, wherein the initialization request is transmitted in response to the battery charge level being greater than a threshold level.

Embodiment 14 is the method of any of embodiments 1 through 13, wherein the at least one signal includes an available memory level.

Embodiment 15 is the method of any of embodiments 1 through 14, wherein the initialization request is transmitted in response to the available memory level being greater than a threshold level.

Embodiment 16 is the method of any of embodiments 1 through 15, wherein the at least one signal includes a click-through rate associated with the content displayed by the first application.

Embodiment 17 is the method of any of embodiments 1 through 16, wherein the initialization request is transmitted in response to the click-through rate being greater than a threshold level.

Embodiment 18 is the method of any of embodiments 1 through 17, wherein the at least one signal includes a predicted conversion rate associated with the content displayed by the first application.

Embodiment 19 is the method of any of embodiments 1 through 18, wherein the initialization request is transmitted in response to the predicted conversion rate being greater than a threshold level.

Embodiment 20 is the method of any of embodiments 1 through 19, wherein the at least one signal includes a network condition of the computing device.

Embodiment 21 is the method of any of embodiments 1 through 20, wherein the initialization request is transmitted in response to the network condition being greater than a threshold level.

Embodiment 22 is the method of any of embodiments 1 through 21, wherein the initialization request includes at least one prefetching parameter to enable the first application to prefetch content over a network from a server computer as a background process.

Embodiment 23 is the method of any of embodiments 1 through 22, further comprising obtaining one or more signals.

Embodiment 24 is the method of any of embodiments 1 through 23, wherein the one or more signals includes at least one of a battery charge level, an available memory level, a click-through rate, a predicted conversion rate, or a network condition.

Embodiment 25 is the method of any of embodiments 1 through 24, further comprising determining to pre-launch the second application based on the one or more signals.

Embodiment 26 is the method of any of embodiments 1 through 25, further comprising determining to prefetch content over a network from a server computer based on the one or more signals.

Embodiment 27 is the method of any of embodiments 1 through 26, wherein the initialization request includes at least one prefetching parameter to enable the second application to prefetch the content as a background process.

Embodiment 28 is the method of any of embodiments 1 through 27, wherein the second application includes a digital store application.

Embodiment 29 is the method of any of embodiments 1 through 28, wherein the first application includes a non-browser application.

Embodiment 30 is the method of any of embodiments 1 through 29, further comprising receiving an indication that user action was taken with respect to the content displayed on the display of the computing device.

Embodiment 31 is the method of any of embodiments 1 through 30, further comprising loading the second application in the foreground process on the display of the computing device.

Embodiment 32 is a non-transitory computer-readable storage medium comprising instructions stored thereon that, when executed by at least one processor, are configured to cause a computing system to perform the method of any of embodiments 1 through 31.

Embodiment 33 is an apparatus comprising means for performing the method of any of embodiments 1 through 31.

Embodiment 34 is an apparatus comprising: at least one processor; and at least one memory including computer program code; the at least one memory and the computer program code configured to, with the at least one processor, cause the apparatus at least to perform the method of any of embodiments 1 through 31.

Embodiment 35 is a method for pre-launching an application using interprocess communication, the method comprising receiving, at an initialization application programming interface (API) of a first application, an initialization request from a second application that is executing as a foreground process of an operating system of a computing device in advance of a user action taken with respect to content displayed on a display of the computing device, establishing, in response to the initialization request, an interprocess communication connection between the first application and the second application to enable the first application and the second application to communicate with each other, and launching, in response to the initialization request, the first application as a background process of the operating system of the computing device.

Embodiment 36 is the method of embodiment 35, wherein the initialization request includes at least one prefetching parameter.

Embodiment 37 is the method of any of embodiments 35 through 36, further comprising retrieving, by the first application, content over a network from a server computer according to the at least one prefetching parameter.

Embodiment 38 is the method of any of embodiments 35 through 37, further comprising storing, by the first application, the content in a memory device of the computing device.

Embodiment 39 is the method of any of embodiments 35 through 38, further comprising receiving, at the initialization API of the second application, a termination request from the second application in response to the content not being displayed on the display or in response to an expiration of a timer.

Embodiment 40 is the method of any of embodiments 35 through 39, further comprising terminating the interprocess communication connection such that the second application that is executing as the background process is terminated.

Embodiment 41 is the method of any of embodiments 35 through 40, wherein the computing device is a mobile computing device.

Embodiment 42 is the method of any of embodiments 35 through 41, wherein the first application is a digital store application.

Embodiment 43 is the method of any of embodiments 35 through 42, wherein the second application is a non-browser application.

Embodiment 44 is a non-transitory computer-readable storage medium comprising instructions stored thereon that, when executed by at least one processor, are configured to cause a computing system to perform the method of any of embodiments 35 through 43.

Embodiment 45 is an apparatus comprising means for performing the method of any of embodiments 35 through 43.

Embodiment 46 is an apparatus comprising: at least one processor; and at least one memory including computer program code; the at least one memory and the computer program code configured to, with the at least one processor, cause the apparatus at least to perform the method of any of embodiments 35 through 43.

Figure 8:
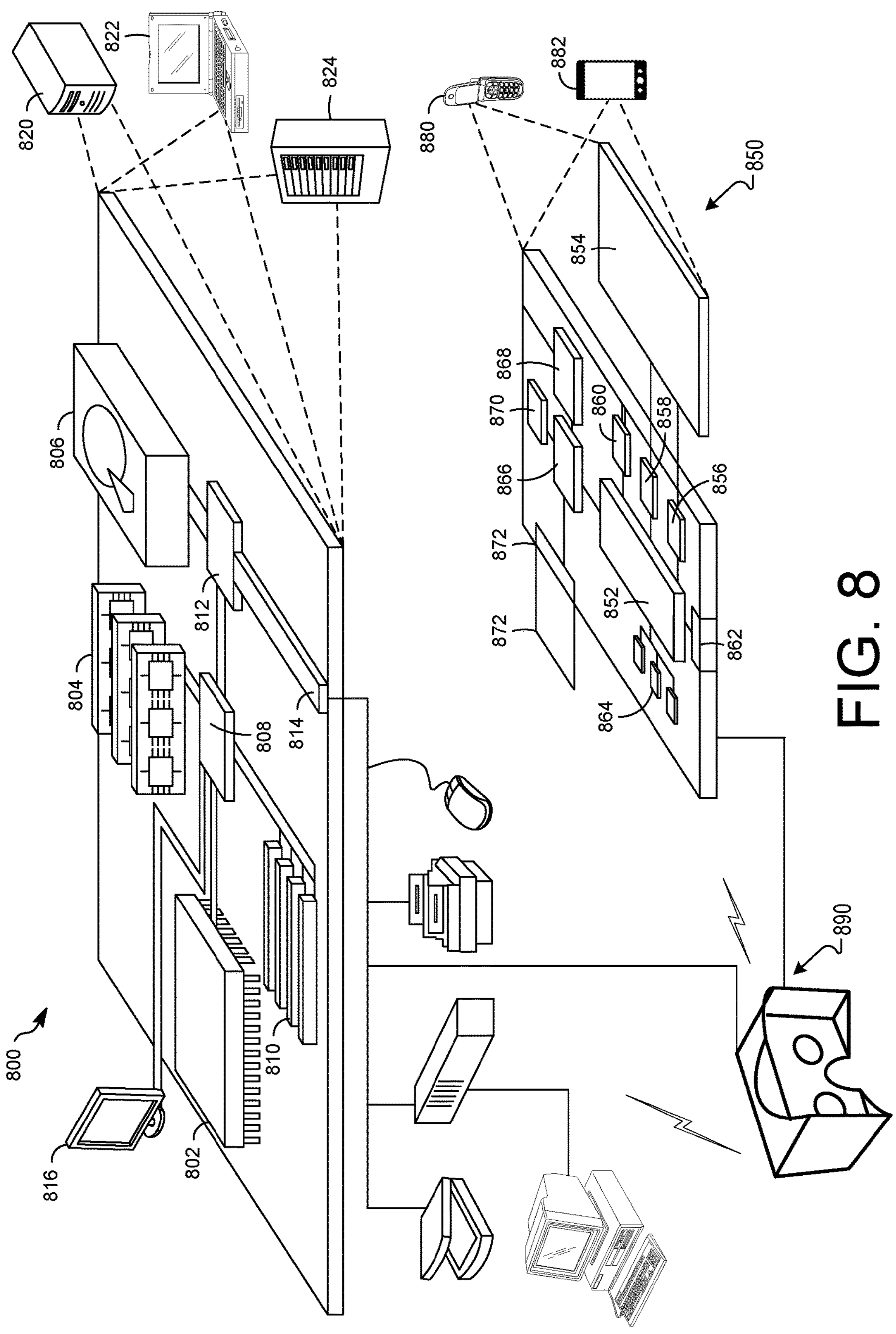
FIG. 8 is a diagram illustrating an example of a computer device and a mobile computer device that can be used to implement the techniques described here.

FIG. 8 shows an example of a computer device 800 and a mobile computer device 850, which may be used with the techniques described here. In some implementations, the computer device 800 is an example of the computing device 102, the computing device 202, the computing device 302, or the computing device 402. In some implementations, the computer device 800 is an example of the server computer 160. In some implementations, the mobile computer device 850 is an example of the computing device 102, the computing device 202, the computing device 302, or the computing device 402. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or another similar mobile device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method for pre-launching an application using interprocess communication, the method comprising:

executing a first application as a foreground process of an operating system of a computing device;

displaying, by the first application, in a user interface of the first application, content associated with an action executable by a second application;

transmitting, by the first application, an initialization request to an initialization application programming interface of the second application in advance of a user action taken with respect to the content displayed in the user interface, the initialization request configured to cause the second application to be launched as a background process of the operating system of the computing device;

establishing, by the first application, an interprocess communication connection with the second application, wherein the interprocess communication connection causes the operating system to assign a memory priority to the background process that corresponds to a memory priority of the foreground process, wherein the memory priority assigned to the background process maintains the background process in an active state throughout a duration of the interprocess communication connection; and in response to the content being removed from the user interface, transmitting, by the first application, a termination request to the initialization application programming interface of the second application via the interprocess communication connection, the termination request configured to cause the background process that is executing the second application to be terminated.

2. The method of claim 1, wherein the initialization request is configured to cause the interprocess communication connection to be established between the first application and the second application to enable the first application and the second application to communicate.

3. The method of claim 2, further comprising:

terminating the interprocess communication connection.

4. The method of claim 1, further comprising:

determining, by the first application, whether or not to transmit the initialization request to the initialization application programming interface of the second application based on at least one signal;

wherein the at least one signal represents a change in a visibility state of the content within the user interface of the first application, and the determination to transmit the initialization request is made in response to the content becoming visible.

5. The method of claim 4, wherein the at least one signal includes a click-through rate associated with the content displayed by the first application, wherein the initialization request is transmitted in response to the click-through rate being greater than a threshold level.

6. The method of claim 4, wherein the at least one signal includes a predicted conversion rate associated with the content displayed by the first application, wherein the initialization request is transmitted in response to the predicted conversion rate being greater than a threshold level.

7. The method of claim 4, wherein the at least one signal includes a network condition of the computing device, wherein the initialization request is transmitted in response to the network condition being greater than a threshold level.

8. The method of claim 1, wherein the background process is a first background process and the initialization request includes at least one prefetching parameter to enable the first application to prefetch content over a network from a server computer as a second background process.

9. The method of claim 1, wherein the content is removed from the user interface in response to a user input received at the user interface.

10. The method of claim 1, wherein the transmitting of the initialization request is performed in response to the displaying of the content.

11. The method of claim 1, further comprising:

in response to the transmitting of the initialization request, receiving, by the first application from the second application, a service instance for invoking one or more methods defined by the initialization application programming interface;

wherein the first application transmits the termination request to the second application via the service instance to cause the background process to be terminated without intervention from a system-level process manager.

12. The method of claim 1, wherein the launching of the second application as a background process includes allocating new memory for the background process, loading application code for the second application into the new memory, and scheduling the background process for central processing unit time.

13. The method of claim 1, wherein the termination request is transmitted to the initialization application programming interface via the interprocess communication connection established between the first application and the second application.

14. The method of claim 1, wherein the first application manages a lifecycle of the background process by transmitting the initialization request in response to the displaying of the content and transmitting the termination request in response to the content being removed from the user interface.

15. A non-transitory computer-readable medium storing executable instructions that when executed by at least one processor cause the at least one processor to execute operations, the operations comprising:

executing a first application as a foreground process of an operating system of a computing device;

displaying, by the first application, in a user interface of the first application, content associated with an action executable by a second application; and transmitting, by the first application, an initialization request to an initialization application programming interface of the second application in advance of a user action taken with respect to the content displayed in the user interface, the initialization request configured to:

cause the operating system to launch the second application as a background process, establish an interprocess communication connection with the second application, wherein the interprocess communication connection causes the operating system to assign a memory priority to the background process that corresponds to a memory priority of the foreground process, wherein the memory priority assigned to the background process maintains the background process in an active state throughout a duration of the interprocess communication connection, and in response to the content being removed from the user interface, transmit, by the first application, a termination request to the initialization application programming interface of the second application via the interprocess communication connection, the termination request configured to cause the background process that is executing the second application to be terminated.

16. The non-transitory computer-readable medium of claim 15, wherein the operations further comprise:

in response to the transmitting of the initialization request, rece1vmg, by the first application from the second application, a service instance for invoking one or more methods defined by the initialization application programming interface.

17. An apparatus for pre-launching an application using interprocess communication, the apparatus comprising:

at least one processor; and a non-transitory computer-readable medium storing executable instructions that when executed by the at least one processor cause the at least one processor to:

receive, at an initialization application programming interface of a first application, an initialization request from a second application that is executing as a foreground process of an operating system of a computing device in advance of a user action taken with respect to content displayed in a user interface of the second application;

establish, by the second application, an interprocess communication connection with the first application, wherein the interprocess communication connection causes the operating system to assign a memory priority to a background process executing the first application that corresponds to a memory priority of the foreground process for managing hardware resources of the computing device, wherein the memory priority assigned to the background process maintains the background process in an active state throughout a duration of the interprocess communication connection;

launch, in response to the initialization request, the first application as the background process of the operating system of the computing device; and in response to the content being removed from the user interface, receive, at the initialization application programming interface of the first application, a termination request from the second application via the interprocess communication connection, the termination request configured to cause the background process that is executing the first application to be terminated.

18. The apparatus of claim 17, wherein the initialization request includes at least one prefetching parameter, the initialization request is configured to cause the first application to prefetch content over a network from a server computer as a second background process, and the executable instructions include instructions that when executed by the at least one processor cause the at least one processor to:

retrieve, by the first application, content over a network from a server computer according to the at least one prefetching parameter; and store, by the first application, the content in a memory device of the computing device.

19. The apparatus of claim 17, wherein the executable instructions that when executed by the at least one processor cause the at least one processor to terminate the background process that is executing the first application further cause the at least one processor to terminate the interprocess communication connection.

* * * * *